(12) United States Patent
Matsumura et al.

(10) Patent No.: US 11,863,009 B2
(45) Date of Patent: Jan. 2, 2024

(54) BATTERY CHARGE TERMINATION VOLTAGE ADJUSTMENT

(71) Applicant: Intel Corporation, Santa Clara, CA (US)

(72) Inventors: Naoki Matsumura, San Jose, CA (US); Aaron Gorius, Upton, MA (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 16/444,623

(22) Filed: Jun. 18, 2019

(65) Prior Publication Data

US 2019/0305574 A1    Oct. 3, 2019

(51) Int. Cl.
*H02J 7/00* (2006.01)
*H02J 7/18* (2006.01)

(52) U.S. Cl.
CPC .......... *H02J 7/18* (2013.01); *H02J 7/007184* (2020.01); *H02J 7/007194* (2020.01)

(58) Field of Classification Search
USPC ....................................................... 307/148
See application file for complete search history.

(56) References Cited

U.S. PATENT DOCUMENTS

| 8,138,721 | B2 | 3/2012 | Yang et al. | |
|---|---|---|---|---|
| 10,985,587 | B2 | 4/2021 | Matsumura et al. | |
| 2002/0053895 | A1* | 5/2002 | Simoes ............. | H02J 7/007186 320/114 |
| 2009/0108804 | A1 | 4/2009 | Aradachi et al. | |
| 2011/0084662 | A1 | 4/2011 | Yang et al. | |
| 2012/0086368 | A1* | 4/2012 | Kawabuchi ............. | B60L 58/24 320/134 |
| 2013/0049702 | A1* | 2/2013 | Dai ......................... | H02J 7/007 320/150 |
| 2013/0207591 | A1* | 8/2013 | Reineccius ........... | H01M 10/44 320/101 |

(Continued)

FOREIGN PATENT DOCUMENTS

| KR | 20090126099 A | 12/2009 |
|---|---|---|
| KR | 101297287 B1 | 8/2013 |

(Continued)

OTHER PUBLICATIONS

International Search Report for Related PCT Application No. PCT/US2020/024481 dated Jul. 8, 2020, 3 pages.

(Continued)

*Primary Examiner* — Rexford N Barnie
*Assistant Examiner* — Xuan Ly
(74) *Attorney, Agent, or Firm* — Schwabe, Williamson & Wyatt, P.C.

(57) ABSTRACT

In some examples, an apparatus is to adjust charge termination voltage. The apparatus includes a controller to adjust a charge termination voltage of a charger of a rechargeable energy storage device based on a comparison of a first threshold level with the voltage of the rechargeable energy storage device during peak load. The charge termination voltage is a voltage at which the rechargeable energy storage device has capacity to support peak load of a system. The controller is to adjust the charge termination voltage based on a comparison of a second threshold level with an end voltage of the rechargeable energy storage device after peak load.

21 Claims, 11 Drawing Sheets

(56) References Cited

U.S. PATENT DOCUMENTS

| | | | | |
|---|---|---|---|---|
| 2016/0020618 | A1 | 1/2016 | Yang et al. | |
| 2016/0064961 | A1* | 3/2016 | DiCarlo | H02J 7/00 |
| | | | | 320/157 |
| 2017/0117721 | A1 | 4/2017 | Toya | |
| 2017/0120773 | A1 | 5/2017 | Zhang et al. | |
| 2022/0140631 | A1* | 5/2022 | Fukushima | H02J 7/02 |
| | | | | 320/118 |

FOREIGN PATENT DOCUMENTS

| | | | |
|---|---|---|---|
| KR | 20170116816 | * | 10/2017 |
| KR | 20170116816 A | | 3/2019 |
| WO | 2017179827 A1 | | 10/2017 |

OTHER PUBLICATIONS

Matsumura et al.: "Battery Charge Termination Voltage Adjustment"; related U.S. Appl. No. 16/057,588, filed Aug. 7, 2018, not yet published, 68 pages.

Final Office Action from U.S. Appl. No. 16/057,588 dated Oct. 13, 2020, 16 pgs.

Non-Final Office Action from U.S. Appl. No. 16/057,588 dated Mar. 6, 2020, 13 pgs.

Notice of Allowance from U.S. Appl. No. 16/057,588 dated Dec. 22, 2020, 8 pgs.

International Search Report & Written Opinion dated Jul. 8, 2020 for PCT Patent Application No. PCT/US2020/024481.

Non-Final Office Action dated Mar. 6, 2020 for U.S. Appl. No. 16/057,588.

Non-Final Office Action dated Sep. 6, 2022 for U.S. Appl. No. 17/232,023, 27 pages.

Extended European Search Report dated May 16, 2023 for EP Application No. 20826741.9, 10 pages.

* cited by examiner

1000

BATTERY CHARGE TERMINATION VOLTAGE ADJUSTMENT

RELATED APPLICATION

This application is related to U.S. patent application Ser. No. 16/057,588 entitled "Battery Charge Termination Voltage Adjustment" to Naoki Matsumura et al. filed on Aug. 7, 2018.

TECHNICAL FIELD

This disclosure relates generally to adjusting a battery charge termination voltage.

BACKGROUND

A stationary computing system such as a server computing system typically uses power from a power supply unit (PSU). If the stationary computing system includes an internal energy storage source such as a battery, the system can perform better by utilizing power from both the PSU and the battery under certain conditions such as when the system is under peak load. The battery can be charged to a fully charged state and used when the system needs more power than the PSU is capable of providing. At peak load, both the PSU and the battery can provide power to the system. After the battery is used to help support peak load of the system, the battery can then be fully charged so that it is ready to be used again when needed to help support peak load. However, charging the battery to a full charge (or 100% charge) each time can limit the life of the battery.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DETAILED DESCRIPTION

Figure 1:
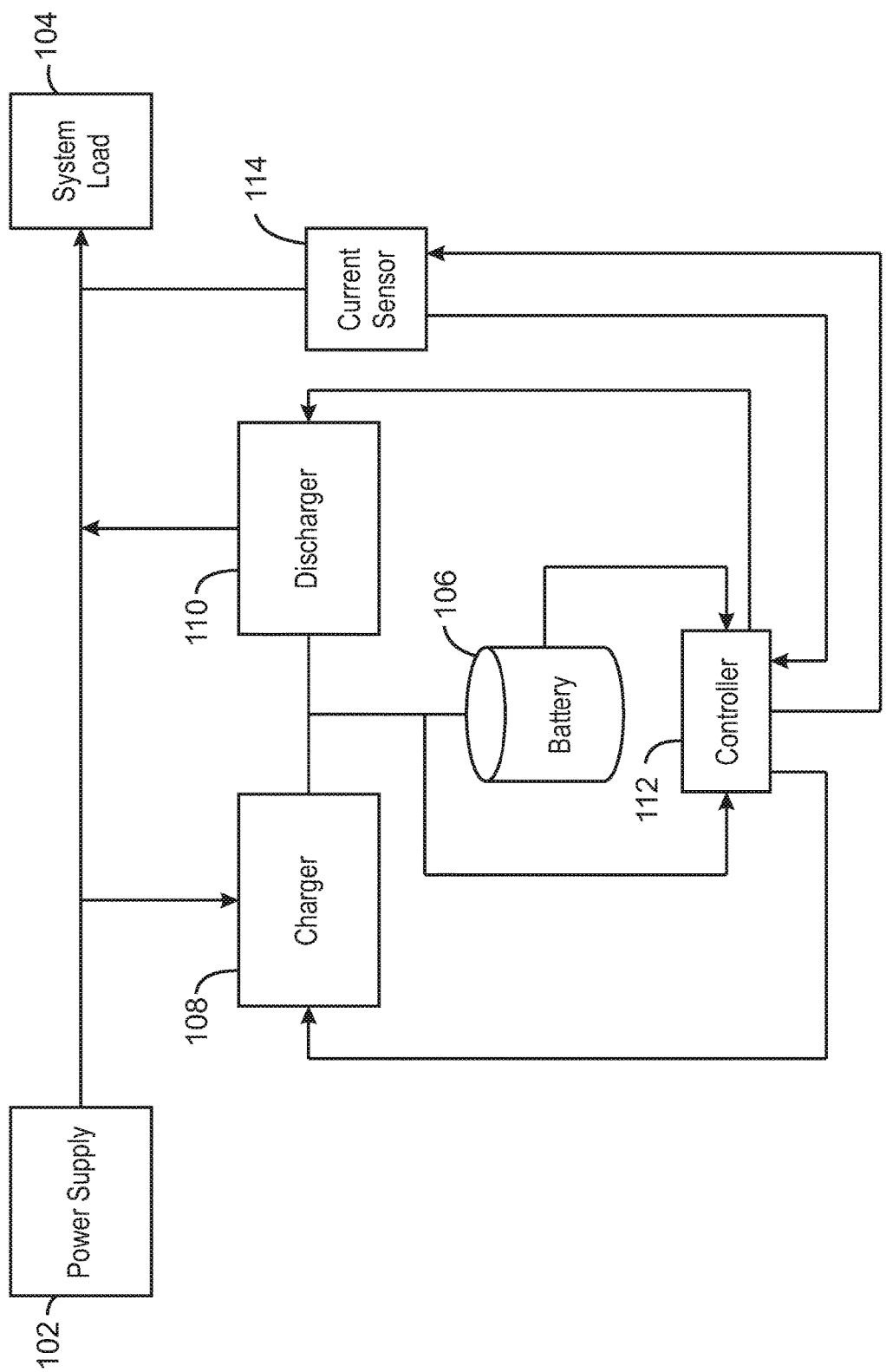
FIG. 1 illustrates a system in accordance with some embodiments.

Some embodiments relate to peak power shaving. For example, in a data center, a battery may be used to supplement power. A stationary computing system (such as, for example, a server) can use a power supply unit (PSU) to supply power to the system. If the system has an internal energy storage device (such as, for example, a lithium ion battery) the system can perform better by utilizing power from both the PSU and the battery. The battery may be used for providing peak power to the system when the system needs more power than PSU capability, for example.

If the battery is fully charged (for example, charged to 100% each time it is charged), the battery can become damaged and battery life can be limited. Keeping a battery at a fully charged state can accelerate battery degradation, can require more frequent battery replacement, and can increase total cost of ownership. However, in accordance with some embodiments, lowering the charge state (for example, lowering the battery voltage) can improve battery longevity. In some embodiments, for example, a lower battery charge termination voltage may be used in a manner in which the battery still has enough capacity to support peak load. In some embodiments, for example, after a battery ages and battery impedance increases, the charge termination voltage may be slightly increased so that the battery still maintains enough capacity to support peak load.

Some embodiments relate to adjusting a battery charge termination voltage. Some embodiments relate to extending battery longevity by adjusting a battery charge termination voltage. Some embodiments relate to adjusting a battery charge termination voltage in a computer system using power from a power supply such as a power supply unit (PSU) as well as power from an internal energy storage device (for example, a rechargeable energy storage device such as, for example, a battery). In some embodiments, battery longevity and/or cycle life can be implemented by adjusting the battery charge termination voltage.

In some embodiments a computing system (for example, a stationary computing system such as a server in a data center) receives power from a power supply such as a PSU. In some embodiments, the system includes a rechargeable energy storage device. In some embodiments, the rechargeable energy storage device can be an internal energy storage device such as one or more renewable energy storage device (for example, one or more battery such as one or more lithium ion battery) to help the system perform better by utilizing power from both the power supply and the energy storage device. The battery (or energy storage device) can be charged and used during times that the system needs more power than the power supply is capable of providing (for example, during peak load times). After these times are over, the battery can then be charged so that it is ready to be used again in a similar manner during other times that the system needs more power.

In some embodiments, an energy storage device such as a battery or other rechargeable energy storage device can be set at an initial charge level that is at a point that just supports the system. This charge level can be increased throughout the life of the battery to continue to support the system in a manner that the battery voltage does not reach a system shutdown voltage, but nears the system shutdown voltage after being used (for example, after being used for peak load support).

In some embodiments, after a rechargeable energy storage device (for example, such as a battery) used in a stationary computing system is used to help supply power to the system (for example, at an end of discharge voltage), each time the remaining voltage comes close to a system shutdown voltage (for example, within a certain tolerance level), the energy storage charge termination voltage is increased by a slight amount. The charge termination voltage can be increased a slight amount as needed (for example, as battery impedance increases). The charge termination voltage can be increased slightly in this manner several times, until the charge termination voltage is close to or at a safety threshold voltage level of the energy storage device. In some embodiments, the energy storage device is charged to a high enough charge termination voltage so that, during use of the energy storage device, the voltage of the energy storage device does not hit the system shutdown voltage.

In some embodiments, the charge termination voltage is lowered to a level where the battery has enough capacity to support peak load. Whenever the voltage during peak load hits a threshold voltage level at which to increase the charge voltage, the charge termination voltage is slightly increased so that the battery maintains enough capacity to support peak load. After repeating peak load and recharge, whenever the end voltage after peak load is above a threshold voltage level at which to decrease the charge voltage (for example, due to temperature increase and/or impedance decrease), the charge termination voltage is slightly decreased. In this manner, the charge termination voltage is slightly increased whenever the voltage during peak load hits (and/or falls below) the threshold voltage level at which to increase the charge voltage, and the charge termination voltage is slightly lowered (or decreased) whenever the end voltage after peak load is above the threshold voltage level at which to decrease the charge voltage. Therefore, in accordance with some embodiments, battery longevity may be extended, less battery replacement may be required, and/or the total cost of ownership may be lowered.

In some embodiments, in a data center and/or server implementation, for example, the total cost of ownership (TCO) can be lowered. This can be accomplished by lowering the load to the power station that delivers power (for example, by lowering the load to the power station that delivers power to the building) and/or made quiescent. In some embodiments, energy is not dumped into the grid and lost, but can be stored in energy storage devices such as batteries, which may be used during peak load, for example. When lulls in the system occur, the energy storage devices may be charged for later use (for example, during peak load). During peak load, the stored energy may be used without demanding additional power from the power station.

FIG. 1 illustrates a system 100 in accordance with some embodiments. In some embodiments, system 100 is a power supply system (for example, a stationary power supply system such as a server power supply system). In some embodiments, system 100 includes a power supply 102 (for example, in some embodiments, a power supply unit 102), a system load 104 (for example, in some embodiments, a stationary computing system load 104), a battery 106, a charger 108, a discharger 110, a controller 112, and a current sensor 114. In some embodiments, power supply 102 is a power supply unit (PSU) that can convert AC power to low-voltage regulated DC power for the internal components of a system such as a computer system. In some embodiments, battery 106 can be any one or more rechargeable energy storage device.

In some embodiments, system 100 is a hybrid power boost (HPB) charging system, and charger 108 is a HPB charger. Charger 108 can provide power to charge the battery 106. Discharger 110 can discharge battery 106 and provide power to system load 104. In some embodiments, controller 112 can be a microcontroller. In some embodiments, controller 112 can be any type of controller, and can include a processor. In some embodiments, controller 112 can be an embedded controller. In some embodiments, controller 112 is a battery controller. In some embodiments, controller 112 is one or more of a microcontroller, a processor, an application specific integrated circuit (ASIC), a digital signal processor (DSP), a field programmable gate array (FPGA), and/or a dedicated integrated circuit, etc.

In some embodiments, system load 104 is a stationary computing system, such as, for example, a server or a desktop, among others. System load 104 can include a processor, a memory, one or more communication devices, etc., as well as other computing device components that make up the rest of the platform and are powered from a power supply 102 and can also be powered by a rechargeable battery such as battery 106. In some embodiments, battery 106 can provide power to system load 104 when system load 104 is at a peak load. In some embodiments, battery 106 is a lithium-ion battery pack (and/or a lithium-ion rechargeable battery). In some embodiments, other rechargeable or non-rechargeable batteries may be used in addition to battery 106 or instead of battery 106.

In some embodiments, an energy storage (for example, such as one or more capacitor) can supplement the voltage provided by battery 106 to system load 104. For example, such an energy storage can include one or more capacitors coupled together (for example, in series). For example, in some embodiments, such an energy storage can be implemented by one or more individual capacitors coupled together in parallel or in series.

Depending on the battery configuration, resistance from the battery cells to a voltage regulator (VR) input can vary. The resistance can also change based on temperature, battery wear, and variation between components. A change from in resistance can result in a considerable difference in peak power that the system can support. Different battery configurations may be used in different embodiments. For example, in some embodiments, the system may use 2S1P (2 series 1 parallel) or 2S2P (2 series 2 parallel) battery configurations.

Controller 112 can provide a charge enable signal to enable charger 108 to charge battery 106 using power from the power supply 102 (for example, when the system load 104 is not under peak load). Controller 112 can also provide a discharge enable signal to enable discharger 110 to discharge battery 106 and provide power to system load 104 (for example, when the system load 104 is under peak load). In some embodiments, controller 112 can monitor battery 106. In some embodiments, controller 112 can use monitored conditions of battery 106 as at least partial input to making decisions such as enabling charger 108, enabling discharger 110, etc. In some embodiments, for example, controller 112 can monitor conditions such as impedance of battery 106, voltage of battery 106, and/or temperature of battery 106, etc., among others. In some embodiments, current sensor 114 can sense current applied to the system load 104. Controller 112 can provide a reference current to current sensor 114, and current sensor 114 can provide a current monitor signal to controller 112, where the current monitor signal provides an indication to controller 112 that corresponds to current applied to system load 104 (for example, in some embodiments, the current monitor signal can indicate whether the current being applied to system load 104 is higher than, equal to, or lower than the reference current value). In some embodiments, controller 112 can use monitored current applied to system load 104 (for example, as at least partial input in making decisions relating to enabling charger 108, enabling discharger 110, etc.)

In some embodiments, current sensor 114 is a device that can detect electric current in a wire (for example, in FIG. 1, can detect current in the wire leading to system load 104), and can generate a signal in response to that current (for example, can generate a current monitor signal that is provided to controller 112). In some embodiments, the signal generated by current sensor 114 can be an analog voltage or current, or can be a digital output signal (for example, a digital output signal that switches when the sensed current exceeds a certain threshold, such as a reference current threshold provided to the current sensor by the controller 112).

In some embodiments, system 100 uses power supply 102 to provide power to the system load 104. An internal energy storage device of system 100 (for example, an internal energy storage device including battery 106) can be used so that power is utilized by system load 104 using both the power supply 102 and the battery 106 under peak load conditions. For example, battery 106 can be kept in a state in which controller 112 controls charger 108 to keep battery 106 fully charged (for example, using power from the power supply 102). Then, when the system load 104 needs more power than the power supply 102 can supply, in addition to power provided from the power supply, system controller 112 controls discharger 110 to provide power from the battery 106 to the system load 104. Controller 112 can then later control charger 108 to charge battery 106 once the peak load condition no longer exists.

Figure 2:
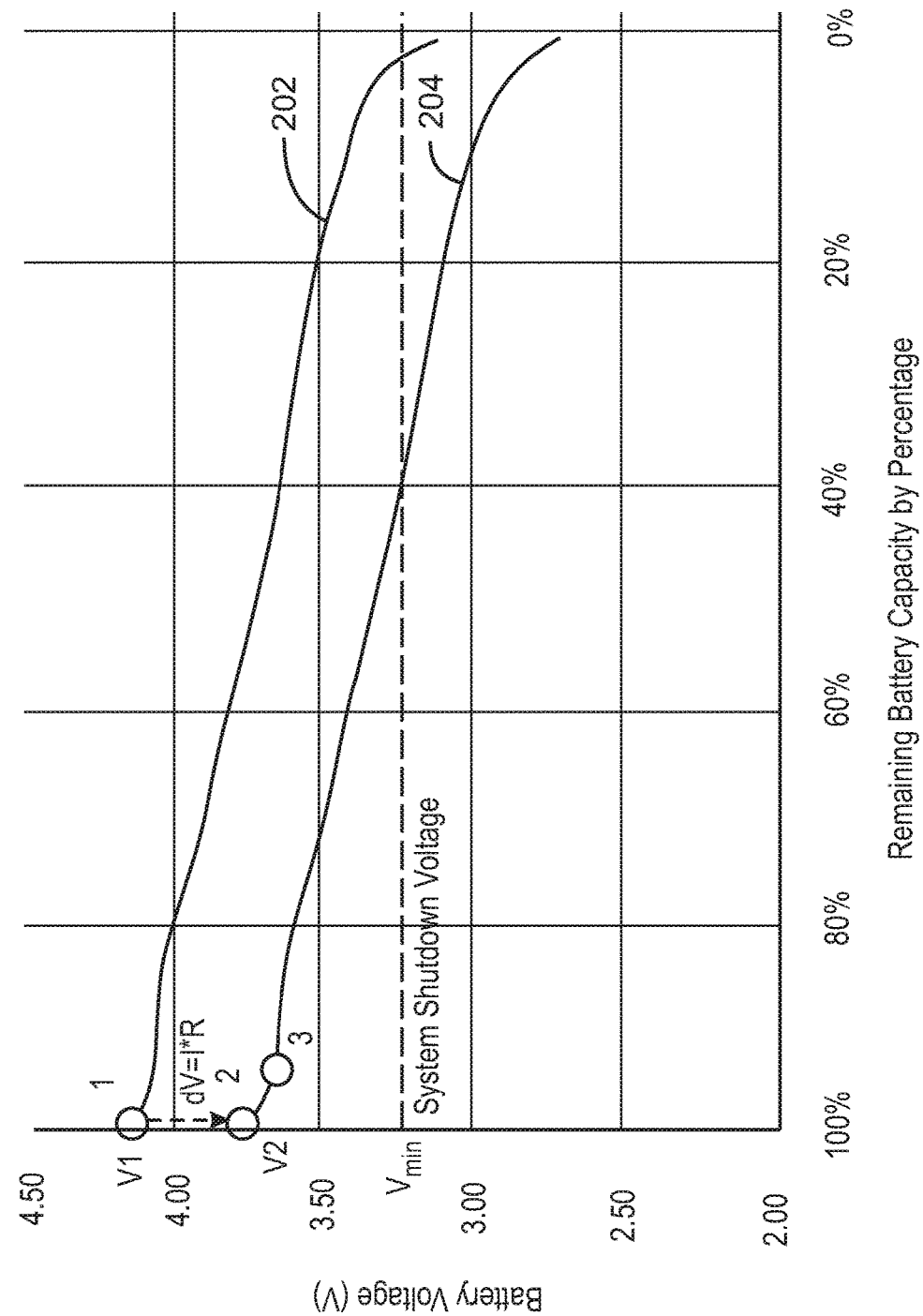
FIG. 2 illustrates a graph illustrating battery voltage and battery capacity.

FIG. 2 is a graph 200 illustrating battery voltage (V) and battery capacity (such as a remaining battery capacity by percentage). Graph 200 includes a battery open circuit voltage graph 202 and a battery voltage under load graph 204. In some embodiments, graph 200 illustrates how battery voltage changes under peak load. For example, when a battery (for example, a battery such as battery 106) is fully charged, the battery voltage may be at voltage V1 illustrated at point 1 in graph 200. When the battery is used under peak load, battery voltage changes (for example, drops) to voltage V2 at point 2, due to, for example, battery impedance. The voltage drop dV (delta V), or voltage change, from V1 to V2 can equal the current (I) times the impedance (R). That is, in some embodiments, $dV=I*R$. If peak load continues, battery voltage moves to the voltage at point 3. After the peak load condition ends, the battery is recharged back to voltage V1 at point 1.

Charging the battery to 100% of remaining battery capacity and then using the battery capacity during peak load conditions can be very beneficial as long as battery voltage stays above a system shutdown voltage ($V_{min}$ in FIG. 2). However, it is noted that maintaining a battery at a fully charged state (for example, at 100% of remaining battery capacity) can accelerate battery degradation and require more frequent battery replacement. This can cause disadvantageous circumstances such as, for example, increasing the cost of ownership of the system. In some embodiments, battery longevity can be extended while supporting peak load without charging the battery to a fully charged state (for example, in a stationary computing system such as a server).

In some embodiments, a charge termination voltage of the battery can be lowered to a level at which the battery has enough capacity to support peak load. After the battery ages and battery impedance increases, the charge termination voltage can be slightly increased so that the battery maintains enough capacity to support peak load. This light increase of the charge termination voltage can be implemented periodically until the battery termination voltage reaches a safety threshold.

Figure 3:
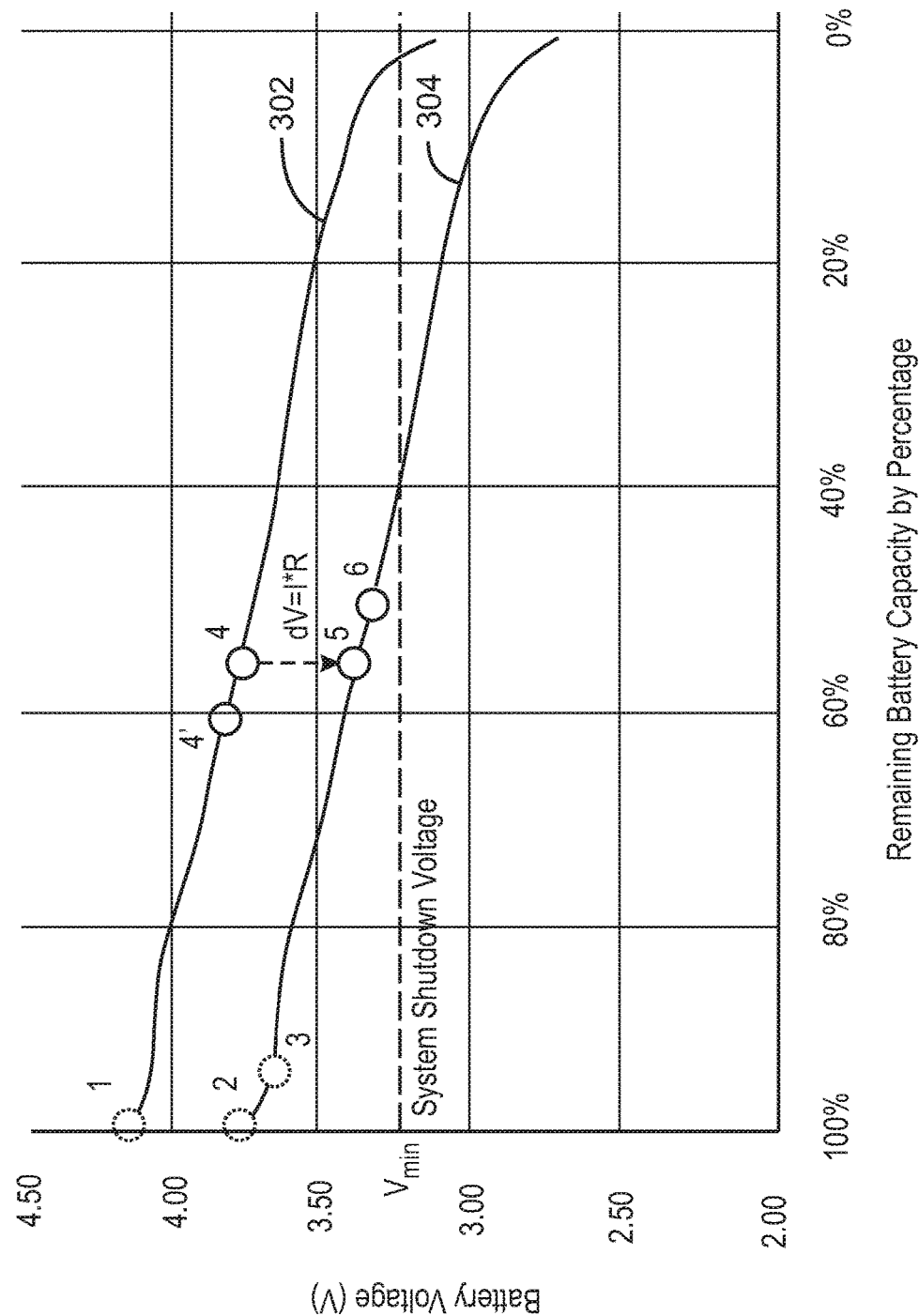
FIG. 3 illustrates a graph illustrating battery voltage and battery capacity in accordance with some embodiments.

FIG. 3 is a graph 300 illustrating battery voltage (V) and battery capacity (such as a remaining battery capacity by percentage). Graph 300 includes a battery open circuit voltage graph 302 and a battery voltage under load graph 304. In some embodiments, charge termination voltage is higher than battery open circuit voltage. During battery charge, for example, in accordance with some embodiments, battery voltage is equal to open circuit voltage plus IR (that is, plus current I times impedance R), according to $V=V_{OC}+IR$, where V is the battery voltage during battery charge, $V_{OC}$ is the open circuit voltage, I is the current, and R is the impedance.

In some embodiments, graph 300 illustrates how battery voltage changes under peak load. For example, in some embodiments, a battery (for example, a battery such as battery 106) may be charged to a lower battery charge voltage (for example, to the battery voltage where its open circuit voltage is at point 4 in FIG. 3 rather than fully charged to the voltage at point 1 in FIG. 2 or dotted point 1 in FIG. 3). When the battery is used under peak load, battery voltage changes (for example, drops) to the voltage at point 5 in FIG. 3 rather than to the voltage V2 at point 2 in FIG. 2 or dotted point 2 in FIG. 3. The change or drop from the voltage at point 4 to the voltage at point 5 is due to, for example, battery impedance. The voltage drop dV (delta V) (or voltage change) from the voltage at point 4 to the voltage at point 5 can equal the current (I) times the impedance (R). That is, in some embodiments, $dV=I*R$. If peak load continues, battery voltage moves to the voltage at point 6. After the peak load condition ends, the battery is recharged back to the voltage where its open circuit voltage is at point 4.

In some embodiments, point 4 is a point high enough that battery voltage after supporting peak load (that is, voltage at point 6) remains above the system shutdown voltage $V_{min}$. When the battery ages, battery internal impedance increases (for example, due to a degradation in chemistry) and the voltage change (for example, voltage drop) dV during peak load (for example, the voltage drop from point 4 to point 5 and point 6) increases. In this situation, the voltage at point 6 gets closer to system shutdown voltage $V_{min}$. Therefore, in some embodiments, the system (for example, system 100 of FIG. 1 using controller 112) can increase the charge termination voltage from the point where open circuit voltage is at point 4 to the point where open circuit voltage is at point 4' to avoid hitting the system shutdown voltage $V_{min}$ when under peak load. That is, in accordance with some embodiments, battery charge termination voltage is changed so that the corresponding open circuit voltage moves from point 4 to point 4' in FIG. 3, for example, in order to avoid battery voltage hitting system shutdown voltage after supporting peak power.

In some embodiments, as the battery ages, the system periodically repeats the increasing of the charge termination voltage from the point where open circuit voltage is 4' to various higher points on graph 302 until the battery charge termination voltage reaches a safety threshold (for example, at 100% remaining battery capacity, near 100% remaining battery capacity, and/or at or near point 1 of graph 302).

In some embodiments, for example, the voltage at point 4 in FIG. 3 may be 3.6 volts, and the voltage at point 4' in FIG. 3 corresponding to new charge termination voltage may be 3.7 volts. In some embodiments, the battery charge termination voltage may be iteratively increased by 0.1 volts each time the battery charge termination voltage needs to be increased (for example, in order to avoid hitting the system shutdown voltage $V_{min}$ when under peak load). That is, FIG. 3 could include a point 4" in FIG. 3 along battery open circuit voltage line 302 corresponding to a point where battery voltage V is 3.8 volts, a point 4''' in FIG. 3 along battery open circuit voltage line 302 corresponding to a point where battery voltage V is 3.9 volts, a point 4'''' in FIG. 3 along battery open circuit voltage line 302 corresponding to a point where battery voltage V is 4.0 volts, etc. These points 4, 4', 4'', 4''', 4'''', 4''''', etc. can continue until the voltage hits the fully charged voltage level at or near point 1 (for example, in some embodiments, at or near 4.2 volts). Although a slight voltage change of 0.1 volts is used in some exemplary embodiments, it is noted that any other slight voltage change may be used in accordance with some embodiments (for example, 0.05 volts, 0.15 volts, or any other voltage increment). Additionally, in some embodiments, the slight voltage increase can be a dynamic increase rather than an increase of a set amount such as 0.1 volts.

In some embodiments, for example, the battery impedance may be considered. For example, in some embodiments, if the battery impedance increases by a certain percentage (for example, increases by 10%), an amount of additional voltage drop (voltage change) may be calculated for considering how much to increase the battery charge termination voltage. That is, in some embodiments, the battery charge termination voltage can be dynamically changed by sensing the impedance (for example, in some embodiments, using a sensor to sense the impedance and provide the sensed impedance to a controller such as controller 112 in FIG. 1 to dynamically change the termination voltage based on the sensed impedance). This impedance can be monitored using a controller or microcontroller such as controller 112 throughout the life of the battery. In some embodiments, the controller or microcontroller can increase the battery charge termination voltage a certain amount that corresponds to the sensed amount (and/or sensed percentage) of increase of the impedance. In some embodiments, the controller (for example, controller 112) can adjust the charging circuit (for example, charger 108) a dynamic amount to elevate the charge voltage of the battery (for example, battery 106) based on the amount of increase of the impedance.

In some embodiments, in charging (for example, in charging the battery from point 6 to point 4 or to point 4' in FIG. 3, or to other battery charge termination voltages, for example) constant current charging may be implemented. In some embodiments, in charging (for example, in charging the battery from point 6 to point 4 or to point 4' in FIG. 3, or to other battery charge termination voltages, for example) constant current charging (constant current or CC) followed by constant voltage charging (constant current constant voltage, or CCCV) may be implemented. In some embodiments, in charging (for example, in charging the battery from point 6 to point 4 or to point 4' in FIG. 3, or to other battery charge termination voltages, for example) constant current charging followed by a rest time for cooling (CC plus rest time) may be implemented. In some embodiments, in charging (for example, in charging the battery from point 6 to point 4 or to point 4' in FIG. 3, or to other battery charge termination voltages, for example) constant current charging followed by constant voltage charging followed by a rest time for cooling (CCCV plus rest time) may be implemented. In some embodiments, for example, rest time can be dynamically added based on a monitoring of battery temperature (for example, monitoring of battery temperature by a controller such as controller 112). That is, rest time can be dynamically added during charging to allow the battery to cool down.

In some embodiments, the lower the battery charge level (battery charge termination voltage and/or remaining battery capacity), the better the expected battery longevity. This is because the lower charge level can correspond to lower battery level, which provides less damage to the battery. For example, in some embodiments, using a battery charge termination voltage at a point of around 60% remaining battery charge capacity rather than at a point of around 100% remaining battery charge capacity can provide better battery longevity. In some embodiments, a battery charge termination voltage is used so that a battery voltage point after supporting peak load (for example, a voltage at point 6) remains close to but above the system shutdown voltage (for example, system shutdown voltage $V_{min}$). In some embodiments, battery voltage is maintained at a voltage that is as low as possible while keeping the voltage level high enough to support peak load and stay above a system shutdown voltage during peak load support. In this manner, battery longevity can be extended while maintaining an ability to support peak load using the battery.

In some embodiments, peak load may last several seconds. In some embodiments, peak load may last tens of seconds. In some embodiments, peak load may last a length of time from several seconds to tens of seconds. In other embodiments, peak load may last different lengths of time. In some embodiments, the battery is discharged quickly (for example, during peak load), but in some embodiments the battery is not discharged as quickly.

In some embodiments, battery impedance may depend on one or more factors, including one or more of battery temperature, degradation, load, state of charge, duration, and/or other factors. In some embodiments, when the target charge voltage is calculated based on the impedance (and/or the increase in impedance), the impedance calculation can consider one or more of these factors (for example, one or more of battery temperature, degradation, load, state of charge, duration, and/or other factors). In some embodiments, impedance may be sensed by sensing the voltage change (for example, the voltage drop) and/or sensing the current to the load (for example, using controller 112 to sense the voltage change and/or the current to the load using current sensor 114) and then calculating the impedance based on these factors. That is, in some embodiments, the impedance may be sensed directly, and in some embodiments, the impedance may be calculated by other sensed factors (for example, sensed voltage change and/or sensed current).

In some embodiments, techniques described herein can be implemented in a system, memory space of a system, in a controller, in a memory space of a controller in a data center system, and/or in a battery pack, for example. In some embodiments, techniques described herein can be implemented in a remote system that is remote from the system load. Such a remote system can send charge voltage control to the data center to charge the battery accordingly. The remote system could be in a host that is on-site, or in any remote location. In some embodiments, techniques described herein can be implemented based on information from a remote integrated circuit (IC), a battery pack and/or from an IC of a battery pack (for example, in a fuel gauging IC). For example, in some embodiments, when impedance is calculated, the information used to calculate the impedance (for example, voltage change information and/or current information) can be provided from a remote IC, a battery pack and/or from an IC of a battery pack (for example, in a fuel gauging IC).

In some embodiments, techniques described herein (and/or implemented by a controller described herein) may be implemented by a firmware embedded solution, an FPGA, a DSP, a discrete ASIC, and/or a processor, etc.

In some embodiments, a system (for example, system 100 and/or system load 104) can be one or more of a computing system, a stationary system, a data center system, a server, a car, a robot, a medical device, and/or a system supporting peak energy use of one or more building such as an office building, an industrial building, a home, an apartment building, etc. In some embodiments, the system can be any system with spare battery capacity (for example, battery capacity that is temporarily spare).

In some embodiments, impedance can include an ohmic portion (for example, impedance for a short duration) and/or a polarization portion (for example, impedance for a long duration).

Implementations using one battery are shown and described herein in some embodiments. However, in some embodiments, a battery as used herein can include one battery, multiple batteries connected in parallel, multiple batteries connected in series, one or more 1S battery, one or more 2S battery, one or more other multi-S battery, etc. In some embodiments, a battery as used herein can be a lithium ion battery with $LiCoO_2$ cathode and graphic anode. In some embodiments, a battery as used herein is applicable to other chemistries.

Some embodiments relate to battery charge termination voltage adjustment. In some embodiments, a first operation includes lowering battery charge termination voltage to a level where the battery has enough capacity to support peak load. In some embodiments, a second operation includes, after the battery ages and/or battery impedance increases, slightly increasing the battery charge termination voltage so that the battery keeps enough capacity to support peak load (for example, in view of the aging battery and/or battery impedance increase). In some embodiments, a third operation includes repeating (for example, periodically repeating) the second operation of slightly increasing the battery charge termination voltage (for example, until the battery charge termination voltage reaches a safety threshold such as, for example, a safety threshold where the remaining battery capacity is approximately 100%).

Some embodiments relate to battery charge termination voltage adjustment. In some embodiments, a first operation includes lowering battery charge termination voltage to a level where the battery has enough capacity to support peak load, such as, for example, point 4 in FIG. 3. It is noted that point 4 in FIG. 3 can be the point where battery voltage after supporting peak load (for example, the voltage at point 6 in FIG. 3) is above a system shutdown voltage (for example, is above system shutdown voltage $V_{min}$ in FIG. 3). In some embodiments, a second operation includes, after the battery ages and/or battery impedance increases (for example, the voltage change or voltage drop dV from point 4 to point 5 and point 6 of FIG. 3 nears the system shutdown voltage $V_{min}$ of FIG. 3), slightly increasing the battery charge termination voltage (for example, from the voltage where open circuit voltage is at point 4 to the voltage where open circuit voltage is at point 4' of FIG. 3) so that the battery keeps enough capacity to support peak load (for example, to avoid hitting the system shutdown voltage $V_{min}$ of FIG. 3 under peak load). In some embodiments, a third operation includes repeating (for example, periodically repeating) the second operation of slightly increasing the battery charge termination voltage (for example, until the battery charge termination voltage reaches a safety threshold such as, for example, a safety threshold where the remaining battery capacity is approximately 100% such as at point 1 of FIG. 3).

Figure 4:
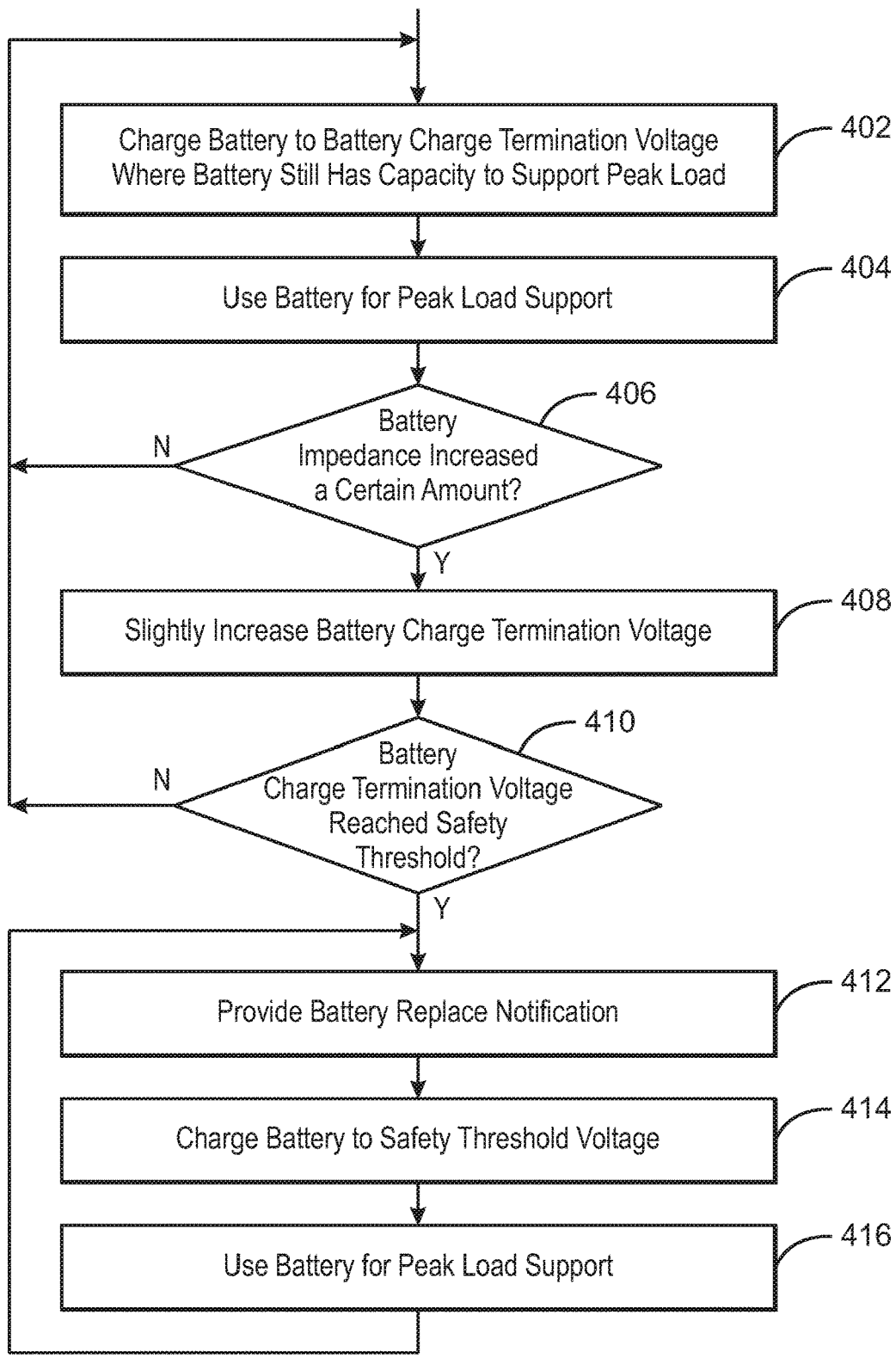
FIG. 4 illustrates battery charge termination voltage adjustment in accordance with some embodiments.

FIG. 4 illustrates a flow diagram 400 that can relate to battery charge termination voltage adjustment according to some embodiments. The operations of flow diagram 400 may be performed by a control unit or a controller (for example, such as controller 112 and/or other units). In some embodiments, the control unit or controller implementing flow 400 may include one or more processors, monitoring logic, control logic, software, firmware, agents, controllers, and/or other modules. In some embodiments, flow 400 can include additional operations and/or does not include all operations illustrated and/or described herein.

At operation 402, a battery is charged to a charge termination voltage where the battery still has the capacity to support peak load. In some embodiments, for example, operation 402 can charge the battery to a battery charge termination voltage level that just supports peak load of the system in a manner that the voltage comes close to the system shutdown voltage after supporting peak load. In some embodiments, at the first time through operation 402, the battery is charged to a low level battery charge termination voltage where the battery still has the capacity to support peak load. In some embodiments, for example, at each iteration, operation 402 can charge the battery to an initial battery charge termination voltage level that just supports peak load of the system in a manner that the voltage comes close to the system shutdown voltage after supporting peak load. In some embodiments, in some later iterations of operation 402, if applicable, after peak load support, operation 402 can charge the battery to a slightly increased battery charge termination voltage that is increased from the initially low level.

In some embodiments, for example, operation 402 can charge the battery to an initial low battery charge termination voltage such as a voltage at which a remaining battery capacity is around 60%, per example. In some embodiments, for example, operation 402 can charge the battery to an initial low voltage such as the voltage at point 4 in FIG. 3, for example. In some embodiments, after peak load support, operation 402 can charge the battery to other slightly increased voltages such as the voltage at point 4' in FIG. 3, and other slightly increased voltages after point 4' in FIG. 3, for example. In some embodiments, after an end of battery discharge voltage after supporting peak load, when the voltage comes close to the system shutdown voltage, battery charge termination voltage is slightly increased so that the battery discharge voltage after subsequently supporting peak load will still remain above the system shutdown voltage.

At operation 404, after the battery has been charged to the battery charge termination voltage where the battery still has capacity to support peak load, the battery may be used for peak load support. At operation 406, after the battery has been used to support peak load, a determination may be made as to whether the battery impedance (for example, the internal battery impedance) has increased a certain amount that is enough to trigger an increase in the battery charge termination voltage. Since an increase in battery impedance will create a higher voltage change (for example, voltage drop) of the battery during use of the battery (for example, during peak load support), the battery may come too close to system shutdown voltage during use, and an increase in battery charge termination voltage may be necessary to ensure that the voltage does not hit the system shutdown voltage during peak load support, for example.

If the battery impedance has not increased the determined amount at operation 406, flow returns to operation 402 to charge the battery to the battery same charge termination voltage (for example, after peak load has been supported, or the voltage has otherwise changed or dropped below the proper level). If the battery impedance has increased that amount at operation 406, flow can move to operation 408, where the battery charge termination voltage is slightly increased (for example, by a small amount such as around 0.1 volts or so, for example, and/or is slightly increased from point 4 in FIG. 3 to point 4' in FIG. 3, or from point 4' in FIG. 3 to a point on line 302 with a corresponding voltage that is slightly higher than the voltage corresponding to that at point 4', for example).

At operation 410, after the battery charge termination voltage has been slightly increased at operation 408, a determination is made as to whether the battery charge termination voltage has reached a safety threshold (for example, has reached a 100% battery charge level, and/or has reached a voltage corresponding to the voltage at point 1 in FIG. 2 or the voltage at point 1 in FIG. 3). If the battery charge termination voltage has not reached the safety voltage at operation 410, flow returns to operation 402, where the battery is charged to the current battery charge termination voltage. If the battery charge termination voltage has reached the safety voltage at operation 410, flow moves to operation 412, where a battery replace notification is provided to indicate that the battery should be changed, for example. At operation 414 the battery is charged to a battery charge termination voltage equal to the safety threshold voltage. Then, at operation 416, after the battery has been charged to the battery charge termination voltage equal to the safety threshold voltage, the battery may be used for peak load support. Then flow returns to operation 412. In this manner, the battery replace notification can be provided at 412, the battery can be charged to the safety threshold voltage at 414, and the battery can be used for peak load support at 416 until the battery is replaced. Once the battery is replaced, flow 400 can begin again at an initial operation of operation 402 (for example, where the new battery is charged at an initial low level battery charge termination voltage where the battery still has capacity to support peak load.

In some embodiments, when the battery charge termination voltage reaches the safety threshold at operation 410, the battery may be close to a dead battery condition. Therefore, in some embodiments, the system (for example, system 100 and/or controller 112) can communicate with a management system (for example, with a data center management system). In some embodiments, the management system can send a robot or a human to come out and to replace the battery (for example, to replace battery 106).

It is noted that many other implementations of flow 400 may be made in accordance with some embodiments. For example, in some embodiments, a battery replace notification may be made before the charge termination voltage reaches the safety threshold. For example, in some embodiments, the battery replace notification may be made at a certain charge termination voltage less than the safety threshold (for example, 0.1 volts lower than the safety threshold, or at some other battery charge termination voltage level). In some embodiments, for example, instead of determining whether battery impedance has increased a certain amount at operation 406, other operations may be performed. For example, an age of the battery determination may be used at operation 406 in accordance with some embodiments.

In general, the lower the charge state of a battery (and/or the lower the battery voltage), the better the expected longevity of the battery. In some embodiments (for example, in some embodiments as described above), a system starts with a lower charge termination voltage where the battery still has enough capacity to support peak load. After the battery ages and battery impedance increases, the charge termination voltage may be slightly increased so that the battery maintains enough capacity to support peak load.

Figure 5:
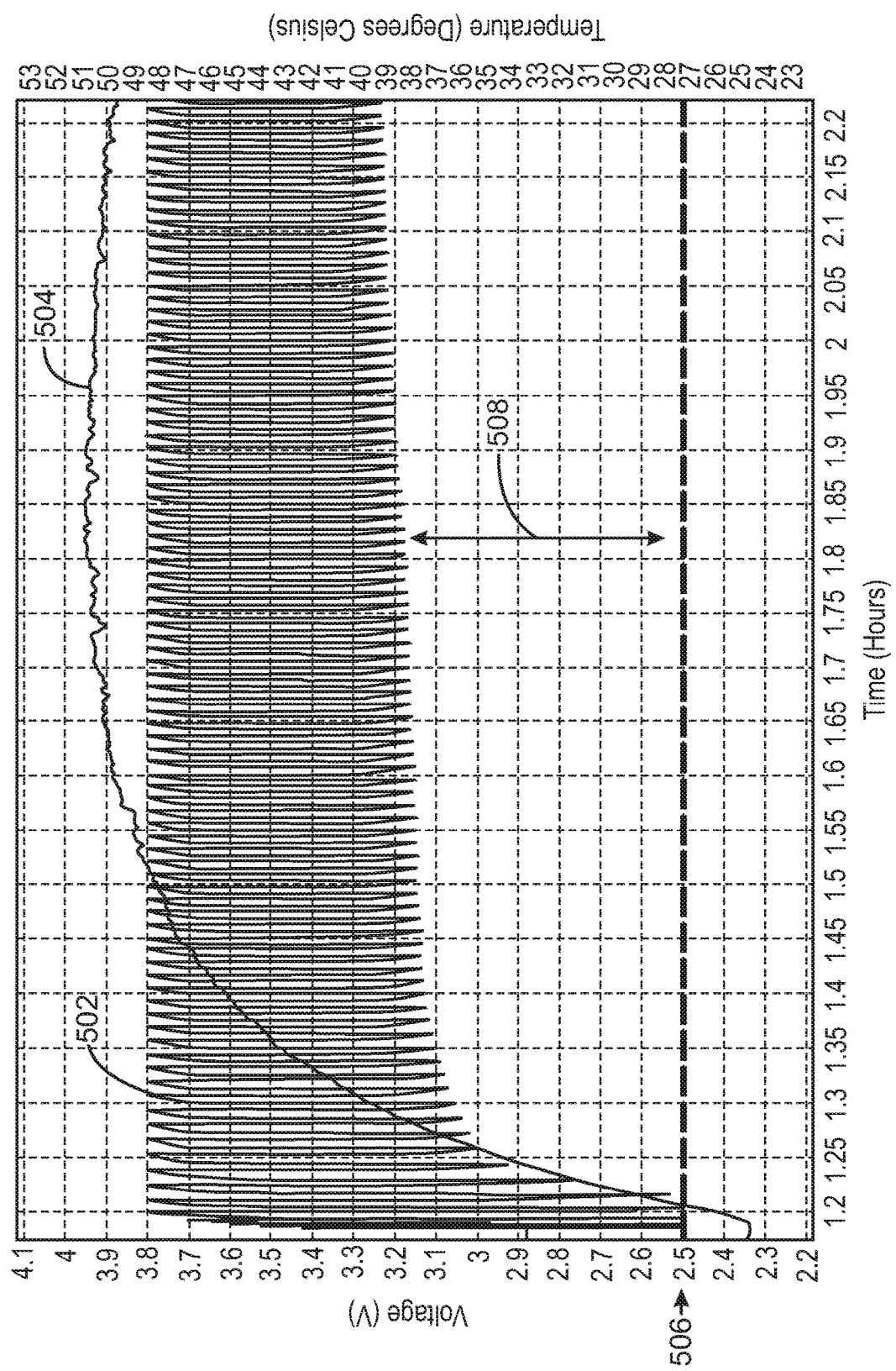
FIG. 5 is a graph illustrating battery voltage and battery temperature in accordance with some embodiments.

FIG. 5 is a graph 500 illustrating battery voltage (V volts) and battery temperature (degrees Celsius) over time. Graph 500 includes a battery voltage under load graph 502 and a battery temperature graph 504.

In some embodiments, FIG. 5 illustrates a case of repeated peak load (for example, with repeated peak load at 4 A for 20 seconds, and then battery recharge). It is noted that FIG. 5 is shown as an example, and many more charges and discharges may occur than as shown in FIG. 5 (that is, the battery under load graph 502 may have a much higher frequency than shown in FIG. 5). In some embodiments, FIG. 5 illustrates a starting battery charge termination voltage of 3.5 volts rather than a standard starting battery charge termination voltage of 4.2 volts, for example. Dotted line 506 illustrates a threshold voltage at which to increase the battery charge voltage (for example, illustrated as 2.5 volts in FIG. 5). When the battery voltage during peak load hits the threshold voltage 506 at which to increase the battery charge voltage, the charge termination voltage may be increased (for example, increased by 0.1 volts from 3.5 volts to 3.6 volts, increased by 0.3 volts from 3.5 volts to 3.8 volts, increased in 0.1 volt increments from 3.5 volts to 3.8 volts each time that the battery charge voltage reaches the threshold voltage 506, etc., among other increases and/or increase increments in accordance with some embodiments).

As illustrated in FIG. 5, after implementing peak power shaving, after repeated charge and discharge of the battery, battery temperature can increase. As the battery temperature increases, the internal impedance of the battery may decrease. Over time, since the battery temperature may increase and the internal impedance of the battery may decrease, even after repeated 4 A for 20 seconds discharge, the battery voltage after discharge may stay at a higher level (for example, in FIG. 5 at a higher voltage of around 3.1V or 3.2V after battery discharge), and the voltage may not again decrease to the threshold level 506.

Although FIG. 5 illustrates an embodiment in which the charge termination voltage is successfully lowered (for example, from 4.2V to 3.8V) while supporting peak load, a gap 508 between the threshold voltage 506 at which to increase the charge voltage and an end discharge voltage of the battery voltage under load 502 that occurs after peak load can become too large over time (for example, as illustrated by gap 508 in FIG. 5). This may occur due to repeated peak load and recharge generate joule heat, increased battery temperature, and/or decreased battery impedance (for example, occurring as a result of increased ionic mobility at higher temperature). When a large gap 508 occurs, charge termination may be increased to a level that is unnecessarily high, which can accelerate battery degradation. Therefore, in accordance with some embodiments, battery longevity may be extended more efficiently in a system that considers, for example, battery temperature and/or battery impedance. In some embodiments, for example, a threshold voltage at which to decrease battery charge voltage may be used to lower charge termination voltage. For example, in some embodiments, after repeating peak load and battery recharge, if the end battery voltage after peak load is above a threshold voltage at which to decrease the battery charge voltage (for example, because of temperature increase and/or impedance decrease), the battery charge termination voltage may be lowered (for example, may be slightly lowered).

In accordance with some embodiments, a battery charge termination voltage may be lowered to and/or set at a level where the battery has enough capacity to support peak load, but is at a level less than a full charge voltage (for example, a lower battery charge termination voltage of 3.5V may be used). When the voltage during peak load reaches a lower threshold level (for example, a threshold voltage at which to increase the charge voltage), the charge termination voltage may be slightly increased (for example, increased by 0.1V) so that the battery maintains enough capacity to support peak load. For example, in some embodiments, a lower threshold voltage level below which the battery charge voltage is to be increased may be 2.5V. After repeating peak load and recharge, if the end voltage after peak load is above an upper threshold level (for example, a threshold level at which to decrease the charge voltage) that occurs, for example, due to battery temperature increase and/or battery impedance decrease, the battery charge termination voltage may be slightly lowered (for example, lowered by 0.05V). For example, in some embodiments, an upper threshold voltage level above which the battery charge voltage is to be decreased may be 2.8V. The battery charge termination voltage may be slightly increased each time the voltage during peak load falls below the lower threshold level (for example, a 2.5V lower threshold), and may be slightly decreased each time the end voltage after peak load is above the upper threshold level (for example, a 2.8V upper threshold), until the battery charge termination voltage reaches a safety threshold level (for example, at 100% remaining battery capacity, near 100% remaining battery capacity, at or near a safety voltage threshold of 4.2V, and/or at or near point 1 of graph 302 in FIG. 3).

Figure 6:
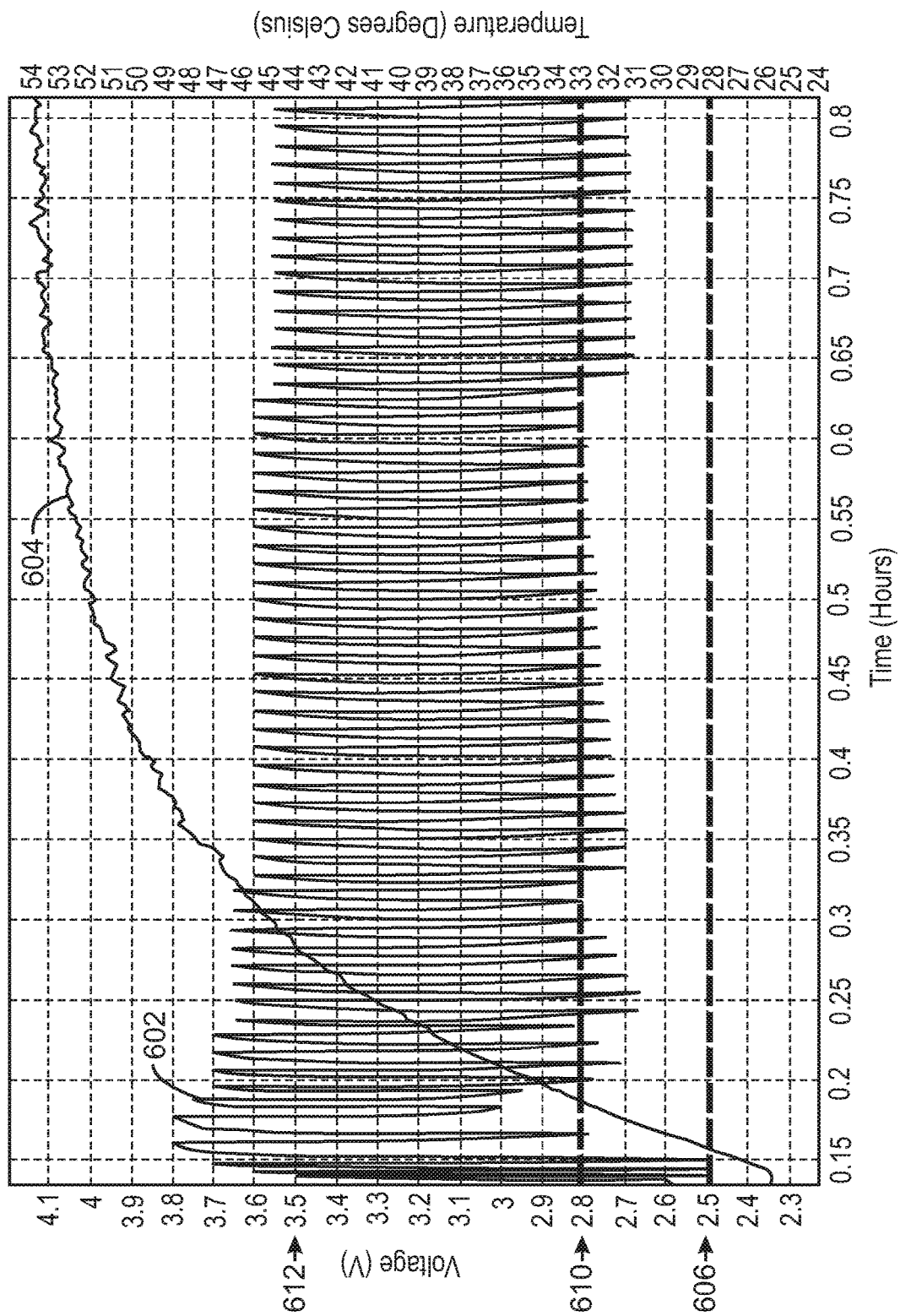
FIG. 6 is a graph illustrating battery voltage and battery temperature in accordance with some embodiments.

FIG. 6 is a graph 600 illustrating battery voltage (V volts) and battery temperature (degrees Celsius) over time. Graph 600 includes a battery voltage under load graph 602 and a battery temperature graph 604. Graph 600 also illustrates a lower threshold voltage 606 (for example, 2.5V), an upper threshold voltage 610 (for example, 2.8V), and an initial charge termination voltage 612 (for example, 3.5V).

As illustrated in FIG. 6, at the beginning, when the battery voltage hits the lower threshold voltage 606, the charge voltage is increased a slight amount (for example, increased by 0.1V in some embodiments). As illustrated in FIG. 6, the charge voltage is increased from the initial charge voltage 612 by 0.1V each time the lower threshold voltage is hit (for example, each time the voltage hits or falls below the lower threshold voltage 606). However, as the battery temperature 604 increases (and/or, for example, as the battery impedance decreases), when the end voltage after peak power load is either at the upper threshold voltage 610 or ends above the threshold voltage 610, for example, the charge voltage is slightly decreased (for example, as illustrated in FIG. 6, may be decreased by 0.05V). The voltage at the end of each peak power load may be compared to the threshold voltage 610. In this manner, in response to the comparison of the voltage at the end of peak power with the threshold voltage 610, a determination may be made to decrease the battery charge voltage, and battery life may be improved as a result.

In some embodiments, FIG. 6 illustrates a case of repeated peak load (for example, with repeated peak load with 4 A for 20 seconds, and then battery recharge). In some embodiments, FIG. 6 illustrates a starting battery charge termination voltage 612 of 3.5 volts rather than a standard starting battery charge termination voltage of 4.2 volts, for example. Dotted line 606 illustrates a threshold voltage at which to increase the battery charge voltage (for example, illustrated as 2.5 volts in FIG. 6). Dotted line 610 illustrates a threshold voltage at which to decrease the battery charge voltage (for example, illustrated as 2.8 volts in FIG. 6).

When the battery voltage during peak load hits the lower threshold voltage 606 at which to increase the battery charge voltage, the charge termination voltage may be increased (for example, increased by 0.1 volts from 3.5 volts to 3.6 volts, increased by 0.3 volts from 3.5 volts to 3.8 volts, increased in 0.1 volt increments from 3.5 volts to 3.8 volts each time that the battery charge voltage reaches the threshold voltage 606, etc., among other increases and/or increase increments in accordance with some embodiments).

When the end battery voltage after peak load is above the higher threshold voltage 610 at which to decrease the battery charge voltage, the charge termination voltage may be decreased (for example, decreased by 0.05 volts from 3.8 volts to 3.75 volts, decreased by 0.05 volts from 3.75 volts to 3.7 volts, and/or decreased by 0.05 volts each time that the end battery voltage after peak load remains above the upper threshold voltage 610, etc., among other decreases and/or decrease increments in accordance with some embodiments).

As illustrated in FIG. 6, in some embodiments, charge termination voltage starts at an initial charge termination voltage 612. The initial charge termination voltage 612 may be lower than a traditional full charge voltage in some embodiments. For example, initial charge termination voltage 612 may be 3.5V rather than a traditional full charge voltage of 4.2V in accordance with some embodiments. When voltage during peak load reaches a lower voltage threshold 606 at which to increase the charge voltage (for example, a lower threshold voltage of 2.5V), the charge termination voltage may be increased so that the battery maintains enough capacity to support peak load (for example, increased by 0.1V). As illustrated in FIG. 6, charge termination voltage may increase from 3.5V to 3.8V, increasing by 0.1V each time voltage during peak load reaches the lower voltage threshold 606, for example. After repeating peak load and recharge, if the end voltage after peak load is above the upper voltage threshold 610 (for example, a threshold voltage at which to decrease the charge voltage, and/or an upper threshold voltage of 2.8V), which may occur, for example, due to a battery temperature increase and/or a battery impedance decrease, the charge termination voltage may be slightly decreased (for example, slightly decreased by 0.05V). FIG. 6 illustrates an example in which charge termination voltage may be decreased in 0.05V decrements from 3.8V to 3.55V as end voltage after peak load stays above the upper voltage threshold 610. That is, each time end voltage after peak load stays above the upper voltage threshold 610, the charge termination voltage is decreased by 0.05V in the example illustrated in FIG. 6. In some embodiments, the battery charge termination voltage is then increased each time the voltage during peak load is low enough to reach the lower threshold voltage 606, and the battery charge termination voltage is then decreased each time the end voltage after peak load stays above the upper threshold voltage 610, until the battery charge termination voltage reaches a battery safety voltage (for example, at 100% remaining battery capacity, near 100% remaining battery capacity, at or near a safety voltage threshold of 4.2V, and/or at or near point 1 of graph 302 in FIG. 3).

It is noted that FIG. 6 illustrates an example in which, after the end voltage after peak load is at or above the upper threshold 610, the end voltage after peak load does not again reach the lower threshold 606. However, it is noted that the end voltage after peak load may reach the lower threshold 606 again in some embodiments. For example, in some embodiments, if the battery temperature 604 decreases again (for example, after a long period of relaxation and/or non-use of the battery), the lower threshold may be again reached and the charge termination voltage may then again be slightly increased (for example, by 0.1V in some embodiments). In some embodiments, the charge termination voltage may be increased in such an embodiment if the voltage 602 reaches the lower voltage threshold 606 (for example, is at or below threshold voltage 606). In some embodiments, the charge termination voltage may again be slightly increased (for example, by 0.1V in some embodiments) based on a sensed decrease in the battery temperature 604.

Although the battery termination voltage has been described and illustrated herein as being changed in response to a comparison of the end voltage after peak load with a voltage threshold, the battery termination voltage may be changed in accordance with some embodiments in response to a change in other factors. For example, in some embodiments, battery termination voltage may be changed in response to a change in battery temperature and/or in response to a change in battery impedance (for example, a change in internal battery impedance). In some embodiments, for example, the battery charge termination voltage may be slightly increased in response to a decrease in battery temperature and/or in in response to an increase in battery impedance, and/or the battery charge termination voltage may be slightly decreased in response to an increase in battery temperature and/or in response to a decrease in battery impedance.

Figure 7:
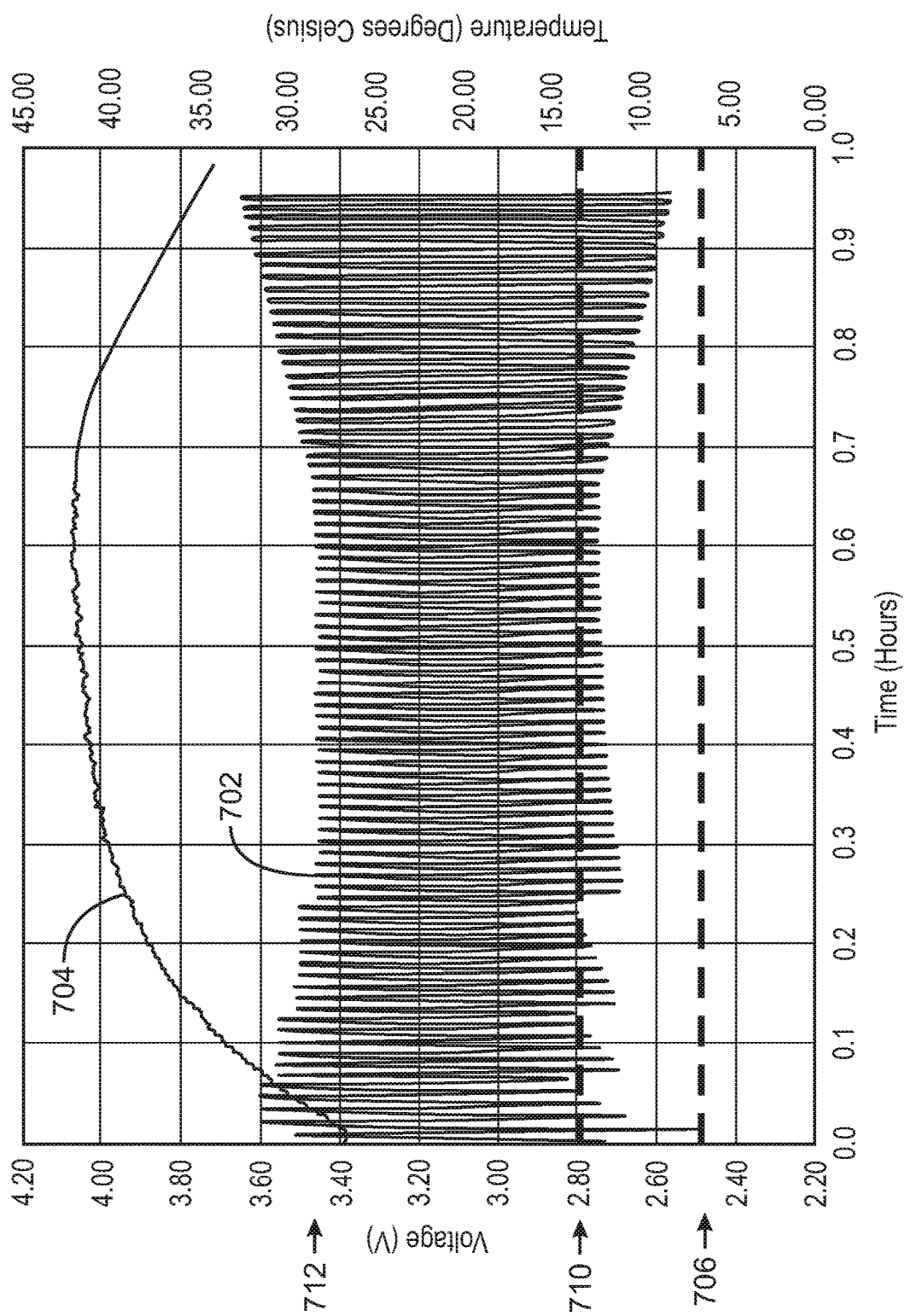
FIG. 7 is a graph illustrating battery voltage and battery temperature in accordance with some embodiments.

FIG. 7 is a graph 700 illustrating battery voltage (V volts) and battery temperature (degrees Celsius) over time. Graph 700 includes a battery voltage under load graph 702 and a battery temperature graph 704. Graph 700 also illustrates a lower threshold voltage 706 (for example, 2.5V), an upper threshold voltage 710 (for example, 2.8V), and an initial charge termination voltage 712 (for example, 3.5V).

In some embodiments, FIG. 7 illustrates a case of repeated peak load (for example, with repeated peak load with 4 A for 20 seconds, and then battery recharge). In some embodiments, FIG. 7 illustrates a starting battery charge termination voltage 712 of 3.5 volts rather than a standard starting battery charge termination voltage of 4.2 volts, for example. Dotted line 706 illustrates a threshold voltage at which to increase the battery charge voltage (for example, illustrated as 2.5 volts in FIG. 7). Dotted line 710 illustrates a threshold voltage at which to decrease the battery charge voltage (for example, illustrated as 2.8 volts in FIG. 7).

When the battery voltage during peak load hits the lower threshold voltage 706 at which to increase the battery charge voltage, the charge termination voltage may be increased (for example, increased by 0.1 volts from 3.5 volts to 3.6 volts, increased by 0.3 volts from 3.5 volts to 3.8 volts, increased in 0.1 volt increments from 3.5 volts to 3.8 volts each time that the battery charge voltage reaches the threshold voltage 706, etc., among other increases and/or increase increments in accordance with some embodiments.

When the end battery voltage after peak load is above the higher threshold voltage 710 at which to decrease the battery charge voltage, the charge termination voltage may be decreased (for example, decreased by 0.05 volts from 3.6 volts to 3.55 volts, decreased by 0.05 volts from 3.55 volts to 3.5 volts, decreased by 0.05 volts from 3.5 volts to 3.45 volts, and/or decreased by 0.05 volts each time that the end battery voltage after peak load remains above the upper threshold voltage 710, etc., among other decreases and/or decrease increments in accordance with some embodiments).

As illustrated in FIG. 7, in some embodiments, charge termination voltage starts at an initial charge termination voltage 712. The initial charge termination voltage 712 may be lower than a traditional full charge voltage in some embodiments. For example, initial charge termination voltage 712 may be 3.5V rather than a traditional full charge voltage of 4.2V in accordance with some embodiments. When voltage during peak load reaches a lower voltage threshold 706 at which to increase the charge voltage (for example, a lower threshold voltage of 2.5V), the charge termination voltage may be increased so that the battery maintains enough capacity to support peak load (for example, increased by 0.1V).

After repeating peak load and recharge, if the end voltage after peak load is above the upper voltage threshold 710 (for example, a threshold voltage at which to decrease the charge voltage, and/or an upper threshold voltage of 2.8V), which may occur, for example, due to a battery temperature increase and/or a battery impedance decrease, the charge termination voltage may be slightly decreased (for example, slightly decreased by 0.05V).

In some embodiments, when battery temperature starts decreasing, battery impedance may start increasing. In some embodiments illustrated in FIG. 7, for example, charge termination voltage may be increased when battery temperature decreases, and/or battery termination voltage may be increased when battery impedance decreases. This increase in charge termination voltage may be implemented, for example, to support peak load. In some embodiments, battery charge termination voltage may be calculated by battery impedance, which is a function of battery temperature. In some embodiments, future battery temperature by thermal inertia may also be considered.

In some embodiments, the battery charge termination voltage is then increased each time the voltage during peak load is low enough to reach the lower threshold voltage 706, and/or the battery charge termination voltage is then increased each time the battery temperature decreases, and/or the battery charge termination voltage is then increased each time the battery impedance increases, and/or the battery charge termination voltage is then adjusted based on thermal inertia (for example, the battery charge termination voltage is increased based on an increase in thermal inertia), and/or the battery charge termination voltage is then decreased each time the end voltage after peak load stays above the upper threshold voltage 710, until the battery charge termination voltage reaches a battery safety voltage (for example, at 100% remaining battery capacity, near 100% remaining battery capacity, at or near a safety voltage threshold of 4.2V, and/or at or near point 1 of graph 302 in FIG. 3).

In accordance with some embodiments (for example, in any embodiments illustrated and/or described herein, including examples illustrated in reference to FIGS. 5, 6, and 7), the lower the charge level (for example, 0% of safety threshold voltage instead of 100%), the better the expected battery longevity. This is due to lower charge level corresponding to lower battery voltage, which creates less damage to the battery, for example. In some embodiments, battery voltage is maintained as low as possible while maintaining enough voltage to support peak load. This is implemented even after battery temperature and/or battery impedance changes, and extends battery longevity.

Figure 8:
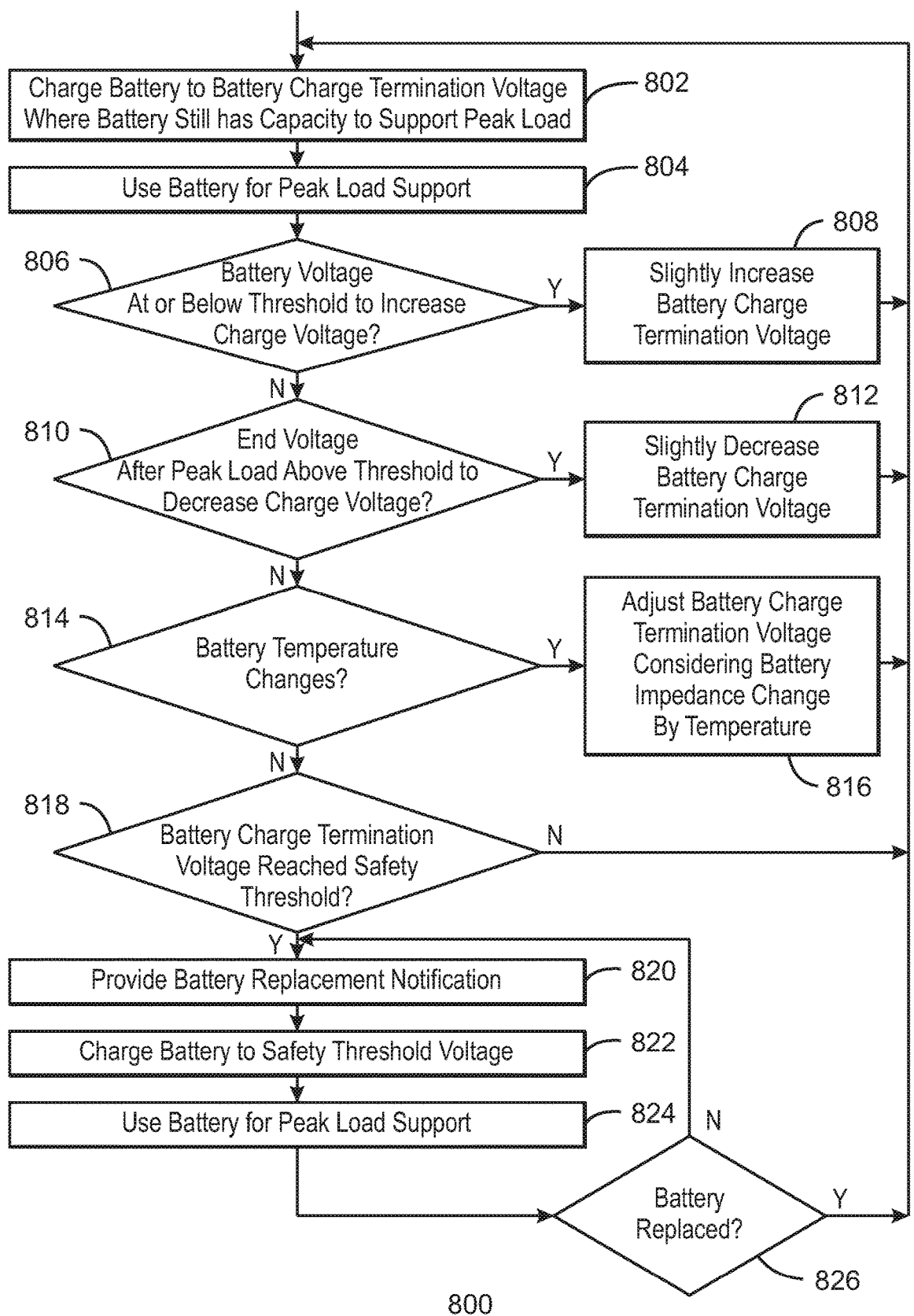
FIG. 8 illustrates battery charge termination voltage adjustment in accordance with some embodiments.

FIG. 8 illustrates a flow diagram 800 in accordance with some embodiments. In some embodiments, FIG. 8 illustrates battery charge termination voltage adjustment in accordance with some embodiments. In some embodiments, flow 800 may be implemented by any of system 100, system 900, and/or system 1000, and/or any portion of those systems, for example. In some embodiments, flow 800 may be implemented by processor 1102 performing instructions 1106. The operations of flow diagram 800 may be performed by a control unit or a controller (for example, such as controller 112, controller 912, processor 1002, processor 1102, and/or other units). In some embodiments, the control unit or controller implementing flow 800 may include one or more processors, monitoring logic, control logic, software, firmware, agents, controllers, and/or other modules. In some embodiments, flow 800 can include additional operations and/or does not include all operations illustrated and/or described herein.

At 802 the battery is charged to a battery termination voltage at which the battery still has capacity to support peak load (for example, to 3.5V in some embodiments). The battery is used for peak load at 804. At 806 a determination is made as to whether the battery voltage during peak load had hit (for example, is at or below) a threshold to increase the battery charge voltage (for, example, is at or below a lower threshold voltage at which the battery charge voltage is to be increased, and/or is at or below a threshold voltage of 2.5V). If the battery voltage has hit the threshold at 806, the battery charge termination voltage is increased (for, example, is slightly increased, and/or is increased by 0.1V) at 808. If the battery voltage has not hit the threshold at 806, a determination is made at 810 as to whether an end voltage after peak load is above (for example, is at or above) a threshold voltage at which to decrease the battery charge voltage (for example, the end voltage after peak load is at or above an upper threshold voltage at which the battery charge voltage is to be decreased, and/or is at or above 2.8V). If the end voltage after peak load is above (for example, at or above) the threshold to decrease the battery charge voltage at 810, the battery charge termination voltage is decreased (for example, is slightly decreased, and/or is decreased by 0.05V) at 812. If the end voltage after peak load is not above (for example, is not at or above) the threshold to decrease the battery charge voltage at 810, a determination is made at 814 as to whether battery temperature changes have occurred (and/or in some embodiments, as to whether battery impedance changes have occurred, and/or as to whether thermal inertia changes have occurred). If battery changes (and/or battery impedance changes, and/or thermal inertia changes) have occurred at 814, the battery charge termination voltage is adjusted at 816 (for example, the battery charge termination voltage is adjusted considering battery impedance change, battery temperature change, etc.) If battery changes (and/or battery impedance changes, and/or thermal inertia changes) have not occurred at 814, a determination is made at 818 as to whether the battery charge termination voltage has reached a safety threshold voltage level (for example, a safety threshold voltage level of 4.2V). If the battery charge termination voltage has not reached a safety threshold voltage level at 818, flow returns to 802. If the battery charge termination voltage has reached a safety threshold voltage level at 818, a battery replacement notification is made at 820. The battery is charged to the safety threshold voltage level at 822, and the battery is used for peak load support at 824. After peak load support, a determination is made at 826 as to whether the battery has been replaced. If the battery has been replaced at 826, flow returns to 802. If the battery has not been replaced at 826, flow returns to 820.

In accordance with some embodiments, the voltage threshold at which to decrease battery charge voltage (for example, an upper threshold, and/or a 2.8V threshold) may be higher than the voltage threshold at which to increase the battery charge voltage (for example, a lower threshold, and/or a 2.5V threshold). However, other voltages and/or relative voltages for the threshold at which to decrease battery charge voltage and/or the threshold at which to increase battery charge voltage may be implemented in accordance with some embodiments.

In some embodiments, a charge voltage increase of 0.1V and a charge voltage decrease of 0.05V has been used in accordance with some examples. However, other voltage increments for the charge voltage increase and/or for the charge voltage decrease may be used in accordance with some embodiments.

In some embodiments, voltage decrease may be calculated based on the gap between end battery voltage (for example, end battery voltage after peak load) and the threshold voltage at which to decrease the battery charge voltage.

In some embodiments, battery charge termination voltage may be calculated based on battery impedance. For example, battery charge termination voltage may be calculated based on battery impedance that is a function of present battery temperature, and/or is a function of battery charge current and/or battery discharge current, and/or is a function of a difference between battery temperature and ambient temperature, which leads to future battery temperature.

In some embodiments, the charge and/or discharge current may be actively limited. This can result in asymmetric operation that can be used to manage the temperature of the battery. For example, more discharge may be allowed earlier in time to achieve a steady state temperature, or may allow higher charge to temporarily cool the battery.

In some embodiments, the charge and/or discharge current may be actively limited, and the voltage thresholds may be limited and/or adjusted in order to actively manage the battery impedance, and/or to improve battery longevity or lower costs.

In some embodiments, future battery lifespan may be predicted. In some embodiments, a history of battery impedance and/or battery temperature may be used to manage present and future current and voltage thresholds. For example, in some embodiments, one or more voltage thresholds may be dynamically changed based on current measurements (for example, based on current measurements of battery temperature and/or of battery impedance), and/or may be dynamically changed based on historical measurements (for example, based on historical measurements of battery temperature and/or of battery impedance). In some embodiments, one or more voltage thresholds may be dynamically changed based on future predictions (for example, based on future predictions of battery temperature and/or future predictions of battery impedance). For example, in accordance with some embodiments, voltage thresholds such as voltage values 506, 606, 610, 612, 706, 710, and/or 712 may be adjusted (for example, may be dynamically adjusted) based on current and/or historical and/or predicted future information (for example, based on current and/or historical and/or predicted future information such as current and/or historical and/or predicted future battery temperature information and/or such as current and/or historical and/or predicted future battery impedance information). Such adjustments may be made to help increase battery lifespan.

In some embodiments, charging currents may be adjusted. For example, current capabilities may be reduced based on system constraints (for example, based on provided system constraints). For example, if an owner of the system is interested in having the battery obtain a particular life (such as, for example, five years of life in exchange for less capability), currents and/or voltage thresholds may be adjusted accordingly. For example, if the device is labelled as a 20 A device, but the system begins bumping into thresholds and battery temperatures and/or impedances are heading in the wrong direction, a system manager may be used to reduce currents (for example, lower than 20 A) and extend the life of the battery. This may be dynamically implemented (for example, using a tuner knob type of implementation). The system may be biased (tuned) more toward performance or longevity (for example, higher performance or lower total cost of ownership), for example, by the owner of the system according to particular needs, and may be changed over time.

In some embodiments, the future lifespan of one or more batteries may be predicted. Accurately predicting battery lifespan can be very advantageous for the seller of the battery, the original equipment manufacturer, and the customer. Balancing between performance and lifespan can be of great benefit. In some embodiments, when temperature plateaus, a battery can have a very long lifespan using the techniques described herein. Therefore, in some embodiments, if greater performance is desired, more current may be pulled in and out of the battery, and more performance may be obtained from the battery during the life of the product while still maintaining an increased lifespan. In some embodiments, if battery packs implemented in accordance with techniques described herein are used in parallel, batteries may be allowed to warm up or cool down at a specific rate to implement higher performance based on the characteristics of the workload of the batteries. A system user may then be able to pull out one of the battery packs and save money and run the remaining batteries at higher performance in accordance with some embodiments.

In some embodiments, techniques illustrated and/or described herein may be implemented in a memory space of the system. In some embodiments, techniques illustrated and/or described herein may be implemented in a battery pack. In some embodiments, techniques illustrated and/or described herein may be implemented in a remote system that controls a system with the battery, including any of the systems described and/or illustrated herein.

In some embodiments, techniques illustrated and/or described herein may be based on information from an integrated circuit (IC) in a battery pack (for example, from a fuel gauging IC).

In some embodiments, techniques illustrated and/or described herein may be implemented in hardware, software, in firmware, and/or in any combination of hardware, software, and/or firmware. In some embodiments, techniques illustrated and/or described herein may be implemented in one or more field programmable gate array (FPGA) device, an application specific integrated circuit (ASIC), etc., and/or in other devices.

In some embodiments, systems illustrated and/or illustrated and/or described herein may be stationary systems. In some embodiments, systems illustrated and/or described herein may be portable systems. In some embodiments, systems illustrated and/or described herein may be included in a car, a robot, a medical device, and/or other systems. In some embodiments, systems illustrated and/or described herein may be included in any system that has an energy storage device and/or a battery. In some embodiments, systems illustrated and/or described herein may support peak energy use of a building (such as a residential building, a commercial building, an industrial building, an office building, etc.)

As used herein, impedance may include an ohmic portion. Additionally, impedance as used herein may include a polarization portion.

Some embodiments relate to use with a 1S battery. Some embodiments relate to a multi-S battery (for example, a 2S battery, a 4S battery, etc.)

In some embodiments, a battery may be a lithium ion battery (for example, a Li-ion battery with $LiCoO_2$ cathode and graphite anode). In some embodiments, a battery may be a battery with other chemistries.

In some embodiments, a voltage window between battery charge termination voltage and end voltage of peak load may be chosen. This voltage window may be chosen to maintain the charge termination voltage as low as possible. In some embodiments, the window may be chosen to maintain charge termination voltage as low as possible considering joule heat battery impedance (which may depend on charge state and/or heat by chemical reaction during charge and/or discharge).

Figure 9:
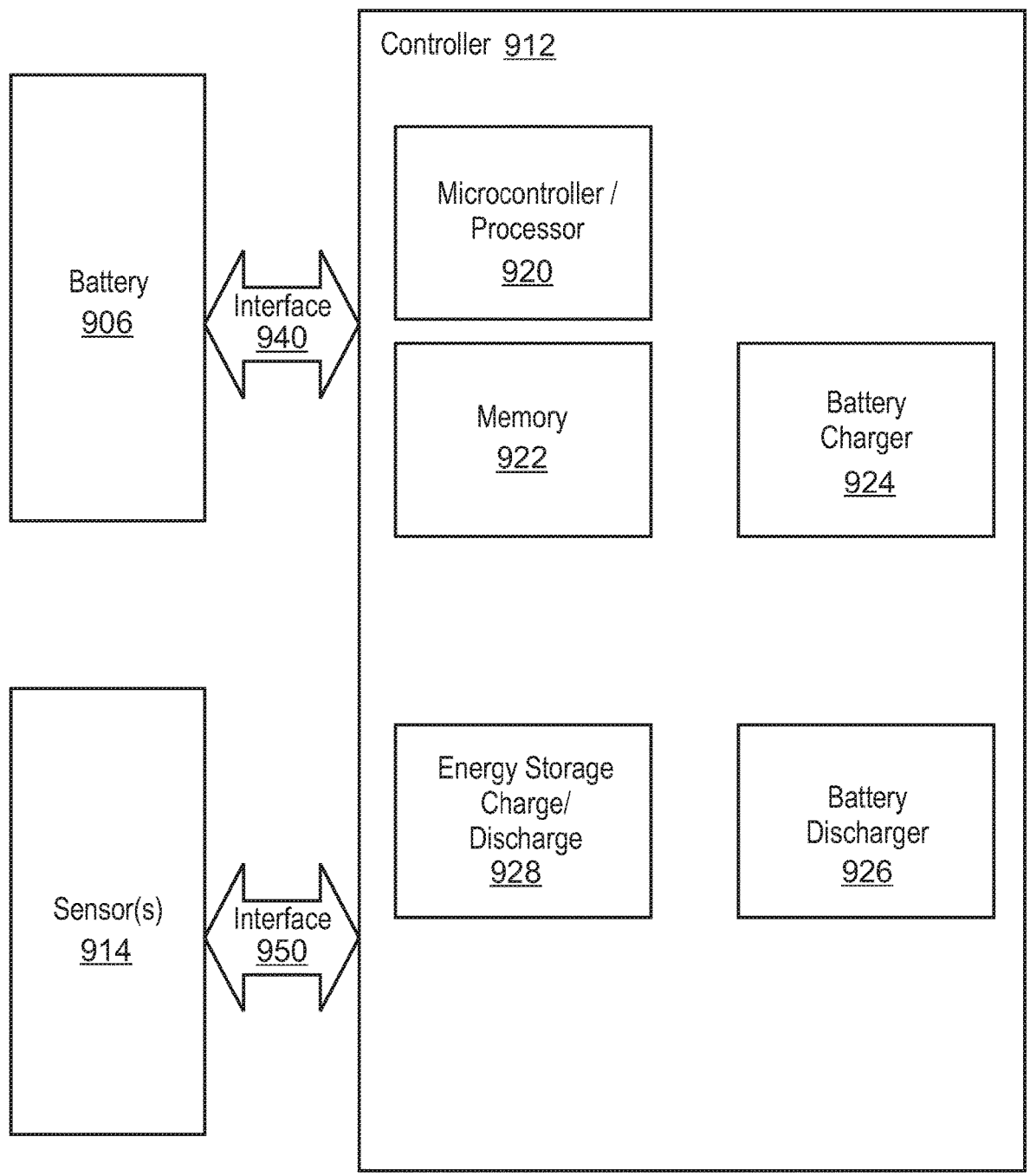
FIG. 9 illustrates a system in accordance with some embodiments.

FIG. 9 illustrates a system 900 in accordance with some embodiments. In some embodiments, system 900 includes a battery 906, a controller 912, and one or more sensor 914. In some embodiments, one or more sensor 914 includes one or more current sensor 914. In some embodiments, one or more sensor 914 includes one or more voltage sensor 914. In some embodiments, one or more sensor 914 includes one or more temperature sensor 914. In some embodiments, one or more sensor 914 includes a group of one or more sensors that can include one or more voltage sensors, and/or one or more current sensors, and/or one or more temperature sensors. In some embodiments, one or more sensors 914 can include one or more voltage/current/temperature sensors. In some embodiments, battery 906 is the same as or similar to battery 106. In some embodiments, controller 912 is the same as or similar to controller 112. In some embodiments, sensor(s) 914 is one or more sensor that is the same as or similar to current sensor 114. In some embodiments, controller 912 is a battery controller. In some embodiments, controller 912 is one or more of an application specific integrated circuit (ASIC), a digital signal processor (DSP), a field programmable gate array (FPGA), a processor, etc. including some of all of the functional blocks in FIG. 9 In some embodiments, all or part of controller 912 is implemented in software as stored on a memory (for example, memory 922) and executed by, for example, a processor or microcontroller (for example, microcontroller/processor 920). In some embodiments, controller 912 can be, for example, a control integrated circuit (IC). In some embodiments, controller 912 can be part of a power management integrated circuit (PMIC). In some embodiments, controller 912 can be part of a fuel gauge. In some embodiments, controller 912 can be part of a battery management system.

Controller 912 interfaces with battery 906 using an interface 940. Interface 940 can include a physical interface for supplying power and ground. In some embodiments, interface 940 includes a data interface.

Controller 912 interfaces with sensor(s) 914 using an interface 950. Interface 950 can include a physical interface for supplying power and ground. In some embodiments, interface 950 includes a data interface. In some embodiments, interface 950 can include one or more interfaces.

In some embodiments, controller 912 includes a processor or microcontroller 920, a memory 922, battery charger 924, battery discharger 926, and/or energy storage charge/discharge 928 (for example, included in battery power supplemental logic). In some embodiments, battery power supplemental logic included in controller 912 can determine whether the power provided by the battery of the power supply system is to be supplemented or not from energy storage. In some embodiments, battery power supplemental logic included in controller 912 can include a voltage supplemental module that can determine whether to supplement the power provided by the battery based on, for example, the voltage currently being provided to the system load. This may be based on voltage monitoring hardware that provides voltage measurements to voltage supplemental module. In some embodiments, if the voltage droops below a threshold, or other predetermined level, yet is above the voltage minimum of the system, then voltage supplemental module can trigger and control the power supply system to have the power provided by the battery to be supplemented by power form the energy storage. This control may include turning on/off switches in the power delivery system to enable power to flow to the system load or to energy storage, and/or to protect other components in the system, to decouple the system load from the battery, etc.

In some embodiments, battery power supplemental logic in controller 912 includes an energy storage charge and discharge module 928 that can control components in a hybrid power boost charging system such as, for example, system 100 to cause the energy storage to be charged at times and to be discharged and/or disabled at other times.

Controller 912 can also include mode selection logic that determines when to enter a particular mode, such as, for example, a charging mode or a discharging mode.

While not shown in FIG. 9, controller 912 can include analog-to-digital converters (ADCs), filters, and a digital amplifier. One or more of the ADCs, filters, and digital amplifier may be, for example, an ASIC, a DSP, an FPGA, a processor, etc. These elements may be used to convert and analog measurement (for example, battery current and voltage) to a digital value for use in the battery charging control process. The digital amplifier may be a differential amplifier that generates an analog signal based on the voltage change (for example, voltage drop) across the battery (for example, the difference in voltage values between the positive and negative terminal of the battery), which is then converted to a filtered digital value using the ADC and the filter.

In some embodiments, controller 912 includes a battery charger 924 to charge the battery using current charge from a power supply.

In some embodiments, a critical voltage level of the system voltages when the protection is activated can be adjusted by the system Embedded Controller, the Fuel Gauge, or the SoC. The adjustment can be made based on the battery state of charge, peak power projections of the SoC or the rest of the platform, system impedance, or changes in system input decoupling, minimum system voltage, etc.

In some embodiments, controller 912 can implement any of the techniques illustrated and/or described herein. In some embodiments, controller 912 can control peak power support and/or battery charge termination voltage adjustment. For example, in some embodiments, controller 912 can implement the flow 400 of FIG. 4 and/or can implement the flow 800 of FIG. 8.

Figure 10:
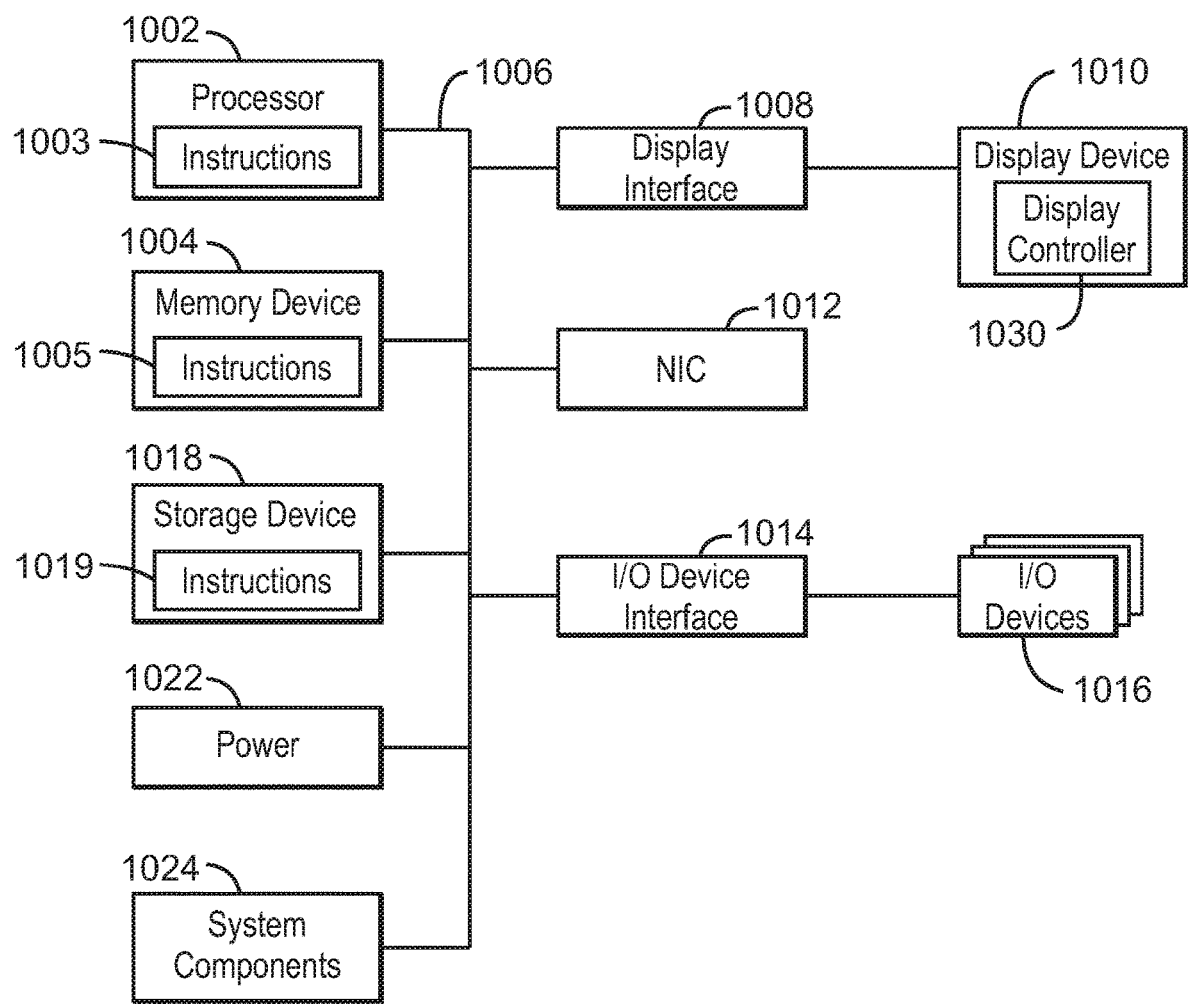
FIG. 10 illustrates a computing system in accordance with some embodiments.

FIG. 10 is a block diagram of an example of a computing device 1000 in accordance with some embodiments. In some embodiments, computing device 1000 may be a computing device including one or more elements of system 100. For example, in some embodiments, computing device 1000 can implement any of the techniques illustrated and/or described herein. In some embodiments, one or more elements of computing device 1000 can be included in controller 112, etc. In some embodiments, computing device 1000 can implement flow 400 and/or flow 800. In some embodiments, computing device 1000 may provide any techniques or functions illustrated and/or described herein.

In some embodiments, functions of computing device 1000 can include, for example, battery charge termination voltage adjustment, and/or any other techniques described and/or illustrated herein, etc., according to some embodiments. In some embodiments, any portion of the flow, circuits or systems illustrated in any one or more of the figures, and any of the embodiments illustrated and/or described herein can be included in or be implemented by computing device 1000. The computing device 1000 may be, for example, a computing device, a controller, a control unit, an application specific controller, and/or an embedded controller, among others.

The computing device 1000 may include a processor 1002 that is adapted to execute stored instructions (for example, instructions 1003), as well as a memory device 1004 (or storage 1004) that stores instructions 1005 that are executable by the processor 1002. The processor 1002 can be a single core processor, a multi-core processor, a computing cluster, or any number of other configurations. For example, processor 1002 can be an Intel® processor such as an Intel® Celeron, Pentium, Core, Core i3, Core i5, or Core i7 processor. In some embodiments, processor 1002 can be an Intel® x86 based processor. In some embodiments, processor 1002 can be an ARM based processor. The memory device 1004 can be a memory device or a storage device, and can include volatile storage, non-volatile storage, random access memory, read only memory, flash memory, or any other suitable memory or storage systems. The instructions that are executed by the processor 1002 may also be used to implement hybrid power boost charging and/or discharging, battery charge termination voltage adjustment, etc. as illustrated and/or described in this specification. In some embodiments, processor 1002 may include the same or similar features or functionality as, for example, various controllers or agents in this disclosure.

The processor 1002 may also be linked through the system interconnect 1006 (e.g., PCI®, PCI-Express®, NuBus, etc.) to a display interface 1008 adapted to connect the computing device 1000 to a display device 1010. The display device 1010 may include a display controller 1030. Display device 1010 may also include a display screen that is a built-in component of the computing device 1000. The display device may also include a computer monitor, television, or projector, among others, that is externally connected to the computing device 1000. In some embodiments, computing device 1000 does not include a display interface or a display device.

In some embodiments, the display interface 1008 can include any suitable graphics processing unit, transmitter, port, physical interconnect, and the like. In some examples, the display interface 1008 can implement any suitable protocol for transmitting data to the display device 1010. For example, the display interface 1008 can transmit data using a high-definition multimedia interface (HDMI) protocol, a DisplayPort protocol, or some other protocol or communication link, and the like In addition, a network interface controller (also referred to herein as a NIC) 1012 may be adapted to connect the computing device 1000 through the system interconnect 1006 to a network (not depicted). The network (not depicted) may be a cellular network, a radio network, a wide area network (WAN), a local area network (LAN), or the Internet, among others.

The processor 1002 may be connected through system interconnect 1006 to an input/output (I/O) device interface 1014 adapted to connect the computing host device 1000 to one or more I/O devices 1016. The I/O devices 1016 may include, for example, a keyboard or a pointing device, where the pointing device may include a touchpad or a touchscreen, among others. The I/O devices 1016 may be built-in components of the computing device 1000, or may be devices that are externally connected to the computing device 1000.

In some embodiments, the processor 1002 may also be linked through the system interconnect 1006 to a storage device 1018 that can include a hard drive, a solid-state drive (SSD), a magnetic drive, an optical drive, a USB flash drive, an array of drives, or any other type of storage, including combinations thereof. In some embodiments, the storage device 1018 can include any suitable applications that can be used by processor 1002 to implement any of the techniques illustrated and/or described herein. In some embodiments, storage 1018 stores instructions 1019 that are executable by the processor 1002. In some embodiments, the storage device 1018 can include a basic input/output system (BIOS).

In some embodiments, a power device 1022 is provided. For example, in some embodiments, power device 1022 can provide peak power support, battery charge termination voltage adjustment, charging, power, power supply, power delivery, power management, peak power management, under-voltage protection, power control, voltage regulation, power generation, voltage generation, power protection, and/or voltage protection, etc. Power 1022 can also include any of the battery voltage adjustment illustrated and/or described herein. In some embodiments, power 1022 can include one or more sources of power supply such as one or more power supply units (PSUs). In some embodiments, power 1022 can be a part of system 1000, and in some embodiments, power 1022 can be external to the rest of system 1000. In some embodiments, power 1022 can provide any of peak power supply support, battery charge termination voltage adjustment, charging, discharging, power, power supply, power delivery, power management, peak power management, under-voltage protection, power control, voltage regulation, power generation, voltage generation, power protection, or voltage protection, power control, power adjustment, or any other techniques such as those illustrated and/or described herein. For example, in some embodiments, power 1022 can provide any of the techniques as described in reference to or illustrated in any of the drawings herein.

FIG. 10 also illustrates system components 1024. In some embodiments, system components 1024 can include any of display, camera, audio, storage, modem, or memory components, or any additional system components. In some embodiments, system components 1024 can include any system components for which power, voltage, power management, etc. can be implemented according to some embodiments as illustrated and/or described herein.

It is to be understood that the block diagram of FIG. 10 is not intended to indicate that the computing device 1000 is to include all of the components shown in FIG. 10 in all embodiments. Rather, the computing device 1000 can include fewer or additional components not illustrated in FIG. 10 (e.g., additional memory components, embedded controllers, additional modules, additional network interfaces, etc.). Furthermore, any of the functionalities of power device 1022 may be partially, or entirely, implemented in hardware or in a processor such as processor 1002. For example, the functionality may be implemented with an application specific integrated circuit, logic implemented in an embedded controller, or in logic implemented in the processor 1002, among others. In some embodiments, the functionalities of power device 1022 can be implemented with logic, wherein the logic, as referred to herein, can include any suitable hardware (e.g., a processor, among others), software (e.g., an application, among others), firmware, or any suitable combination of hardware, software, or firmware. In some embodiments, power device 1022 can be implemented with an integrated circuit.

Figure 11:
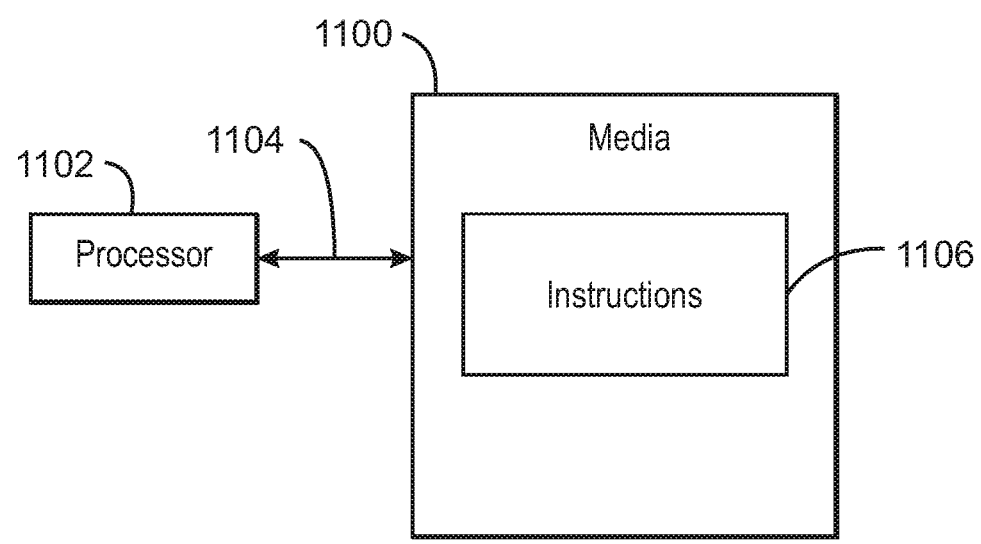
FIG. 11 illustrates one or more processors and one or more media in accordance with some embodiments.

FIG. 11 is a block diagram of an example of one or more processors 1102 and one or more tangible, non-transitory computer readable media 1100 for peak power supply support, battery charger termination voltage adjustment, etc. The one or more tangible, non-transitory, computer-readable media 1100 may be accessed by the processor(s) 1102 over a computer interconnect 1104. Furthermore, the one or more tangible, non-transitory, computer-readable media 1100 may include instructions (or code) 1106 to direct the processor(s) 1102 to perform operations as illustrated and/or described herein. In some embodiments, processor 1102 is one or more processors. In some embodiments, processor(s) 1102 can perform some or all of the same or similar functions that can be performed by other elements illustrated and/or described herein using instructions (code) 1106 included on media 1100 (for example, some or all of the functions or techniques illustrated in and/or described in reference to any of FIGS. 1-10). In some embodiments, one or more of processor(s) 1102 may include the same or similar features or functionality as, for example, various controllers, units, or agents, etc. illustrated and/or described in this disclosure. In some embodiments, one or more processor(s) 1102, interconnect 1104, and/or media 1100 may be included in computing device 1000.

Various components discussed in this specification may be implemented using software components. These software components may be stored on the one or more tangible, non-transitory, computer-readable media 1100, as indicated in FIG. 11. For example, peak power support and/or battery charge termination voltage adjustment, etc. may be adapted to direct the processor(s) 1102 to perform one or more of any of the operations described in this specification and/or in reference to the drawings.

It is to be understood that any suitable number of software components may be included within the one or more tangible, non-transitory computer-readable media 1100. Furthermore, any number of additional software components shown or not shown in FIG. 11 may be included within the one or more tangible, non-transitory, computer-readable media 1100, depending on the specific application.

The various techniques and/or operations described herein (for example, in reference to any one or more of FIGS. 1-10) may be performed by a control unit comprised of one or more processors, monitoring logic, control logic, software, firmware, agents, controllers, logical software agents, system agents, and/or other modules. For example, in some embodiments, some or all of the techniques and/or operations illustrated and/or described herein may be implemented by a system agent. Due to the variety of modules and their configurations that may be used to perform these functions, and their distribution through the system and/or in a different system, they are not all specifically illustrated in their possible locations in the figures.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Example 1 In some examples, a control unit is configured to adjust charge termination voltage of a rechargeable energy storage device (for example, to adjust charge termination voltage of a battery). The control unit is adapted to charge the rechargeable energy storage device to a charge termination voltage where the rechargeable energy storage device has capacity to support peak load but comes close to a system shutdown voltage after supporting peak load, and to increase the charge termination voltage if a voltage of the rechargeable energy storage device is near a system shutdown voltage after supporting peak load.

Example 2 includes the subject matter of example 1. The control unit is adapted to increase the charge termination voltage based on impedance of the rechargeable energy storage device.

Example 3 includes the subject matter of any of examples 1-2. The control unit is adapted to monitor the impedance of the rechargeable energy storage device.

Example 4 includes the subject matter of any of examples 1-3. The control unit is adapted to calculate the impedance of the rechargeable energy storage device based on monitored conditions.

Example 5 includes the subject matter of any of examples 1-4. Monitored conditions include a voltage change of the rechargeable energy storage device and a sensed current.

Example 6 includes the subject matter of any of examples 1-5. The control unit is adapted to increase the charge termination voltage a predetermined amount if the voltage of the rechargeable energy storage device is near the system shutdown voltage after supporting peak load.

Example 7 includes the subject matter of any of examples 1-6. The control unit is adapted to continue to increase the charge termination voltage each time the voltage of the rechargeable energy storage device is near a system shutdown voltage after supporting peak load.

Example 8 includes the subject matter of any of examples 1-7. The control unit is adapted to determine if the charge termination voltage has reached a safety threshold voltage.

Example 9 includes the subject matter of any of examples 1-8. The control unit is adapted to provide a rechargeable energy storage device replacement needed notification if the charge termination voltage has reached the safety threshold voltage.

Example 10 includes the subject matter of any of examples 1-9. The control unit is adapted to charge the rechargeable energy storage device to the safety threshold voltage if the charge termination voltage has reached the safety threshold voltage.

Example 11 In some examples, a method can adjust charge termination voltage of a rechargeable energy storage device. The method can include charging the rechargeable energy storage device to a charge termination voltage where the rechargeable energy storage device has capacity to support peak load but comes close to a system shutdown voltage after supporting peak load, and increasing the charge termination voltage if a voltage of the rechargeable energy storage device is near a system shutdown voltage after supporting peak load.

Example 12 includes the subject matter of example 11. The method includes increasing the charge termination voltage based on impedance of the rechargeable energy storage device.

Example 13 includes the subject matter of any of examples 11-12. The method includes monitoring the impedance of the rechargeable energy storage device.

Example 14 includes the subject matter of any of examples 11-13. The method includes calculating the impedance of the rechargeable energy storage device based on monitored conditions.

Example 15 includes the subject matter of any of examples 11-14. Monitored conditions include a voltage change of the rechargeable energy storage device and a sensed current.

Example 16 includes the subject matter of any of examples 11-15. The method includes increasing the charge termination voltage a predetermined amount if the voltage of the rechargeable energy storage device is near the system shutdown voltage after supporting peak load.

Example 17 includes the subject matter of any of examples 11-16. The method includes continuing to increase the charge termination voltage each time the voltage of the rechargeable energy storage device is near a system shutdown voltage after supporting peak load.

Example 18 includes the subject matter of any of examples 11-17. The method includes determining if the charge termination voltage has reached a safety threshold voltage.

Example 19 includes the subject matter of any of examples 11-18. The method includes providing a rechargeable energy storage device replacement needed notification if the charge termination voltage has reached the safety threshold voltage.

Example 20 includes the subject matter of any of examples 11-19. The method includes charging the rechargeable energy storage device to the safety threshold voltage if the charge termination voltage has reached the safety threshold voltage.

Example 21 In some examples, one or more tangible, non-transitory machine readable media includes a plurality of instructions that, in response to being executed on at least one processor, cause the at least one processor to charge the rechargeable energy storage device to a charge termination voltage where the rechargeable energy storage device has capacity to support peak load but comes close to a system shutdown voltage after supporting peak load, and to increase the charge termination voltage if a voltage of the rechargeable energy storage device is near a system shutdown voltage after supporting peak load.

Example 22 includes the subject matter of example 21. The method one or more tangible, non-transitory machine readable media includes a plurality of instructions that, in response to being executed on at least one processor, cause the at least one processor to increase the charge termination voltage based on impedance of the rechargeable energy storage device.

Example 23 includes the subject matter of any of examples 21-22. The one or more tangible, non-transitory machine readable media include a plurality of instructions that, in response to being executed on at least one processor, cause the at least one processor to monitor the impedance of the rechargeable energy storage device.

Example 24 includes the subject matter of any of examples 21-23. The one or more tangible, non-transitory machine readable media include a plurality of instructions that, in response to being executed on at least one processor, cause the at least one processor to calculate the impedance of the rechargeable energy storage device based on monitored conditions.

Example 25 includes the subject matter of any of examples 21-24. Monitored conditions include a voltage change of the rechargeable energy storage device and a sensed current.

Example 26 includes the subject matter of any of examples 21-25. The one or more tangible, non-transitory machine readable media include a plurality of instructions that, in response to being executed on at least one processor, cause the at least one processor to increase the charge termination voltage a predetermined amount if the voltage of the rechargeable energy storage device is near the system shutdown voltage after supporting peak load.

Example 27 includes the subject matter of any of examples 21-26. The one or more tangible, non-transitory machine readable media include a plurality of instructions that, in response to being executed on at least one processor, cause the at least one processor to continue to increase the charge termination voltage each time the voltage of the rechargeable energy storage device is near a system shutdown voltage after supporting peak load.

Example 28 includes the subject matter of any of examples 21-27. The one or more tangible, non-transitory machine readable media include a plurality of instructions that, in response to being executed on at least one processor, cause the at least one processor to determine if the charge termination voltage has reached a safety threshold voltage.

Example 29 includes the subject matter of any of examples 21-28. The one or more tangible, non-transitory machine readable media include a plurality of instructions that, in response to being executed on at least one processor, cause the at least one processor to provide a rechargeable energy storage device replacement needed notification if the charge termination voltage has reached the safety threshold voltage.

Example 30 includes the subject matter of any of examples 21-29. The one or more tangible, non-transitory machine readable media include a plurality of instructions that, in response to being executed on at least one processor, cause the at least one processor to charge the rechargeable energy storage device to the safety threshold voltage if the charge termination voltage has reached the safety threshold voltage.

Example 31 In some examples, a controller is configured to adjust charge termination voltage of a rechargeable energy storage device. The controller comprising includes means for charging the rechargeable energy storage device to a charge termination voltage where the rechargeable energy storage device has capacity to support peak load but comes close to a system shutdown voltage after supporting peak load, and means for increasing the charge termination voltage if a voltage of the rechargeable energy storage device is near a system shutdown voltage after supporting peak load.

Example 32 includes the subject matter of example 31. The controller includes means for increasing the charge termination voltage based on impedance of the rechargeable energy storage device.

Example 33 includes the subject matter of any of examples 31-32. The controller includes means for monitoring the impedance of the rechargeable energy storage device.

Example 34 includes the subject matter of any of examples 31-33. The controller includes means for calculating the impedance of the rechargeable energy storage device based on monitored conditions.

Example 35 includes the subject matter of any of examples 31-34. Monitored conditions include a voltage change of the rechargeable energy storage device and a sensed current.

Example 36 includes the subject matter of any of examples 31-35. The controller includes means for increasing the charge termination voltage a predetermined amount if the voltage of the rechargeable energy storage device is near the system shutdown voltage after supporting peak load.

Example 37 includes the subject matter of any of examples 31-36. The controller includes means for continuing to increase the charge termination voltage each time the voltage of the rechargeable energy storage device is near a system shutdown voltage after supporting peak load.

Example 38 includes the subject matter of any of examples 31-37. The controller includes means for determining if the charge termination voltage has reached a safety threshold voltage.

Example 39 includes the subject matter of any of examples 31-38. The controller includes means for providing a rechargeable energy storage device replacement needed notification if the charge termination voltage has reached the safety threshold voltage.

Example 40 includes the subject matter of any of examples 31-39. The controller includes means for charging the rechargeable energy storage device to the safety threshold voltage if the charge termination voltage has reached the safety threshold voltage.

Example 41 In some examples, a system can adjust charge termination voltage of a rechargeable energy storage device. The system includes a charger adapted to charge the rechargeable energy storage device and a control unit. The control unit is adapted to send a control signal to the charger to charge the rechargeable energy storage device to a charge termination voltage where the rechargeable energy storage device has capacity to support peak load but comes close to a system shutdown voltage after supporting peak load. The control unit is also to increase the charge termination voltage if a voltage of the rechargeable energy storage device is near a system shutdown voltage after supporting peak load.

Example 42 includes the subject matter of example 41. The control unit is adapted to increase the charge termination voltage based on impedance of the rechargeable energy storage device.

Example 43 includes the subject matter of any of examples 41-42. The control unit is adapted to monitor the impedance of the rechargeable energy storage device.

Example 44 includes the subject matter of any of examples 41-43. The control unit is adapted to calculate the impedance of the rechargeable energy storage device based on monitored conditions.

Example 45 includes the subject matter of any of examples 41-44. Monitored conditions include a voltage change of the rechargeable energy storage device and a sensed current.

Example 46 includes the subject matter of any of examples 41-45. The system includes a current sensor adapted to sense current. The control unit is adapted to increase the charge termination voltage based on (or in response to) the sensed current.

Example 47 includes the subject matter of any of examples 41-46. The control unit is adapted to increase the charge termination voltage a predetermined amount if the voltage of the rechargeable energy storage device is near the system shutdown voltage after supporting peak load.

Example 48 includes the subject matter of any of examples 41-47. The control unit is adapted to continue to increase the charge termination voltage each time the voltage of the rechargeable energy storage device is near a system shutdown voltage after supporting peak load.

Example 49 includes the subject matter of any of examples 41-48. The control unit is adapted to determine if the charge termination voltage has reached a safety threshold voltage.

Example 50 includes the subject matter of any of examples 41-49. The control unit is adapted to provide a rechargeable energy storage device replacement needed notification if the charge termination voltage has reached the safety threshold voltage.

Example 51 includes the subject matter of any of examples 41-50. The control unit is adapted to charge the rechargeable energy storage device to the safety threshold voltage if the charge termination voltage has reached the safety threshold voltage.

Example 52 In some examples, a control unit is configured to adjust charge termination voltage of a rechargeable energy storage device, including means to perform a method as in any other example.

Example 53 In some examples, an apparatus is configured to adjust charge termination voltage. The apparatus includes a controller to adjust a charge termination voltage of a charger of a rechargeable energy storage device based on a comparison of a first threshold level with the voltage of the rechargeable energy storage device during peak load, wherein the charge termination voltage is a voltage at which the rechargeable energy storage device has capacity to support peak load of a system, and to adjust the charge termination voltage based on a comparison of a second threshold level with an end voltage of the rechargeable energy storage device after peak load.

Example 54 includes the subject matter example 53. The controller is to adjust the charge termination voltage based on a temperature of the rechargeable energy storage device.

Example 55 includes the subject matter of any of examples 53-54. The controller is to adjust the charge termination voltage based on an impedance of the rechargeable energy storage device.

Example 56 includes the subject matter of any of examples 53-55. The impedance includes an ohmic portion and a polarization portion.

Example 57 includes the subject matter of any of examples 53-56. The controller is to adjust the first threshold or the second threshold, or both the first threshold and the second threshold, based on one or more temperatures of the rechargeable energy storage device.

Example 58 includes the subject matter of any of examples 53-57. The controller is to adjust the first threshold or the second threshold, or both the first threshold and the second threshold, based on one or more impedances of the rechargeable energy storage device.

Example 59 includes the subject matter of any of examples 53-58. The controller is to adjust the first threshold or the second threshold, or both the first threshold and the second threshold, based on one or more historical temperatures of the rechargeable energy storage device.

Example 60 includes the subject matter of any of examples 53-59. The controller is to adjust the first threshold or the second threshold, or both the first threshold and the second threshold, based on one or more historical temperatures of the rechargeable energy storage device, or based on one or more predicted future temperatures of the rechargeable energy storage device, or based on both historical and predicted future temperatures of the rechargeable energy storage device.

Example 61 includes the subject matter of any of examples 53-60. The controller is to adjust the first threshold or the second threshold, or both the first threshold and the second threshold, based on one or more historical impedances of the rechargeable energy storage device.

Example 62 includes the subject matter of any of examples 53-61. The controller is to adjust the first threshold or the second threshold, or both the first threshold and the second threshold, based on one or more historical impedances of the rechargeable energy storage device, or based on one or more predicted future impedances of the rechargeable energy storage device, or based on both historical and predicted future impedances of the rechargeable energy storage device.

Example 63 includes the subject matter of any of examples 53-62. The controller is to increase the charge termination voltage based on the comparison of the first threshold level with the voltage of the rechargeable energy storage device during peak load, and to decrease the charge termination voltage based on the comparison of the second threshold level with the end voltage of the rechargeable energy storage device after peak load.

Example 64 includes the subject matter of any of examples 53-63. The second threshold level is higher than the first threshold level.

Example 65 includes the subject matter of any of examples 53-64. The controller is to adjust a charge current of the rechargeable energy storage device or a discharge current of the rechargeable energy storage device, or both the charge current of the rechargeable energy storage device and the discharge current of the rechargeable energy storage device, to manage temperature of the rechargeable energy storage device.

Example 66 includes the subject matter of any of examples 53-65. The apparatus includes the charger. The charger is to charge the rechargeable energy storage device to a charge termination voltage at which the rechargeable energy storage device has capacity to support peak load of a system.

Example 67 In some examples, an apparatus is to adjust charge termination voltage. The apparatus includes a charger to charge a rechargeable energy storage device to a charge termination voltage at which the rechargeable energy storage device has capacity to support peak load of a system. The apparatus also includes a controller to adjust a charge termination voltage of a rechargeable energy storage device based on a comparison of a first threshold level with the voltage of the rechargeable energy storage device during peak load, and to adjust the charge termination voltage based on a comparison of a second threshold level with an end voltage of the rechargeable energy storage device after peak load.

Example 68 includes the subject matter of example 67. The controller is to adjust the charge termination voltage based on a temperature of the rechargeable energy storage device.

Example 69 includes the subject matter of any of examples 67-68. The controller is to adjust the charge termination voltage based on an impedance of the rechargeable energy storage device.

Example 70 includes the subject matter of any of examples 67-69. The impedance includes an ohmic portion and a polarization portion.

Example 71 includes the subject matter of any of examples 67-70. The controller is to adjust the first threshold or the second threshold, or both the first threshold and the second threshold, based on one or more temperatures of the rechargeable energy storage device.

Example 72 includes the subject matter of any of examples 67-71. The controller is to adjust the first threshold or the second threshold, or both the first threshold and the second threshold, based on one or more impedances of the rechargeable energy storage device.

Example 73 includes the subject matter of any of examples 67-72. The controller is to adjust the first threshold or the second threshold, or both the first threshold and the second threshold, based on one or more historical temperatures of the rechargeable energy storage device.

Example 74 includes the subject matter of any of examples 67-73. The controller is to adjust the first threshold or the second threshold, or both the first threshold and the second threshold, based on one or more historical temperatures of the rechargeable energy storage device, or based on one or more predicted future temperatures of the rechargeable energy storage device, or based on both historical and predicted future temperatures of the rechargeable energy storage device.

Example 75 includes the subject matter of any of examples 67-74. The controller is to adjust the first threshold or the second threshold, or both the first threshold and the second threshold, based on one or more historical impedances of the rechargeable energy storage device.

Example 76 includes the subject matter of any of examples 67-75. The controller is to adjust the first threshold or the second threshold, or both the first threshold and the second threshold, based on one or more historical impedances of the rechargeable energy storage device, or based on one or more predicted future impedances of the rechargeable energy storage device, or based on both historical and predicted future impedances of the rechargeable energy storage device.

Example 77 includes the subject matter of any of examples 67-76. The controller is to increase the charge termination voltage based on the comparison of the first threshold level with the voltage of the rechargeable energy storage device during peak load, and to decrease the charge termination voltage based on the comparison of the second threshold level with the end voltage of the rechargeable energy storage device after peak load.

Example 78 includes the subject matter of any of examples 67-77. The second threshold level is higher than the first threshold level.

Example 79 includes the subject matter of any of examples 67-79. The controller is to adjust a charge current of the rechargeable energy storage device or a discharge current of the rechargeable energy storage device, or both the charge current of the rechargeable energy storage device and the discharge current of the rechargeable energy storage device, to manage temperature of the rechargeable energy storage device.

Example 80 In some examples, a method is to adjust charge termination voltage. The method includes adjusting a charge termination voltage of a charger of a rechargeable energy storage device based on a comparison of a first threshold level with the voltage of the rechargeable energy storage device during peak load, wherein the charge termination voltage is a voltage at which the rechargeable energy storage device has capacity to support peak load of a system, and adjusting the charge termination voltage based on a comparison of a second threshold level with an end voltage of the rechargeable energy storage device after peak load.

Example 81 includes the subject matter of example 80. The method includes adjusting the charge termination voltage based on a temperature of the rechargeable energy storage device.

Example 82 includes the subject matter of any of examples 80-81. The method includes adjusting the charge termination voltage based on an impedance of the rechargeable energy storage device.

Example 83 includes the subject matter of any of examples 80-82. The impedance includes an ohmic portion and a polarization portion.

Example 84 includes the subject matter of any of examples 80-83. The method includes adjusting the first threshold or the second threshold, or both the first threshold and the second threshold, based on one or more temperatures of the rechargeable energy storage device.

Example 85 includes the subject matter of any of examples 80-84. The method includes adjusting the first threshold or the second threshold, or both the first threshold and the second threshold, based on one or more impedances of the rechargeable energy storage device.

Example 86 includes the subject matter of any of examples 80-85. The method includes adjusting the first threshold or the second threshold, or both the first threshold and the second threshold, based on one or more historical temperatures of the rechargeable energy storage device.

Example 87 includes the subject matter of any of examples 80-86. The method includes adjusting the first threshold or the second threshold, or both the first threshold and the second threshold, based on one or more historical temperatures of the rechargeable energy storage device, or based on one or more predicted future temperatures of the rechargeable energy storage device, or based on both historical and predicted future temperatures of the rechargeable energy storage device.

Example 88 includes the subject matter of any of examples 80-87. The method includes adjusting the first threshold or the second threshold, or both the first threshold and the second threshold, based on one or more historical impedances of the rechargeable energy storage device.

Example 89 includes the subject matter of any of examples 80-88. The method includes adjusting the first threshold or the second threshold, or both the first threshold and the second threshold, based on one or more historical impedances of the rechargeable energy storage device, or based on one or more predicted future impedances of the rechargeable energy storage device, or based on both historical and predicted future impedances of the rechargeable energy storage device.

Example 90 includes the subject matter of any of examples 80-89. The method includes increasing the charge termination voltage based on the comparison of the first threshold level with the voltage of the rechargeable energy storage device during peak load, and decreasing the charge termination voltage based on the comparison of the second threshold level with the end voltage of the rechargeable energy storage device after peak load.

Example 91 includes the subject matter of any of examples 80-90. The second threshold level is higher than the first threshold level.

Example 92 includes the subject matter of any of examples 80-91. The method includes adjusting a charge current of the rechargeable energy storage device or a discharge current of the rechargeable energy storage device, or both the charge current of the rechargeable energy storage device and the discharge current of the rechargeable energy storage device, to manage temperature of the rechargeable energy storage device.

Example 93 In some examples, one or more tangible, non-transitory machine readable media includes a plurality of instructions that, in response to being executed on at least one processor, cause the at least one processor to adjust a charge termination voltage of a charger of a rechargeable energy storage device based on a comparison of a first threshold level with the voltage of the rechargeable energy storage device during peak load, wherein the charge termination voltage is a voltage at which the rechargeable energy storage device has capacity to support peak load of a system, and to adjust the charge termination voltage based on a comparison of a second threshold level with an end voltage of the rechargeable energy storage device after peak load.

Example 94 includes the subject matter of example 93. The one or more tangible, non-transitory machine readable media include a plurality of instructions that, in response to being executed on at least one processor, cause the at least one processor to adjust the charge termination voltage based on a temperature of the rechargeable energy storage device.

Example 95 includes the subject matter of any of examples 93-94. The one or more tangible, non-transitory machine readable media include a plurality of instructions that, in response to being executed on at least one processor, cause the at least one processor to adjust the charge termination voltage based on an impedance of the rechargeable energy storage device.

Example 96 includes the subject matter of any of examples 93-95. The impedance includes an ohmic portion and a polarization portion.

Example 97 includes the subject matter of any of examples 93-96. The one or more tangible, non-transitory machine readable media include a plurality of instructions that, in response to being executed on at least one processor, cause the at least one processor to adjust the first threshold or the second threshold, or both the first threshold and the second threshold, based on one or more temperatures of the rechargeable energy storage device.

Example 98 includes the subject matter of any of examples 93-97. The one or more tangible, non-transitory machine readable media include a plurality of instructions that, in response to being executed on at least one processor, cause the at least one processor to adjust the first threshold or the second threshold, or both the first threshold and the second threshold, based on one or more impedances of the rechargeable energy storage device.

Example 99 includes the subject matter of any of examples 93-98. The one or more tangible, non-transitory machine readable media include a plurality of instructions that, in response to being executed on at least one processor, cause the at least one processor to adjust the first threshold or the second threshold, or both the first threshold and the second threshold, based on one or more historical temperatures of the rechargeable energy storage device.

Example 100 includes the subject matter of any of examples 93-99. The one or more tangible, non-transitory machine readable media include a plurality of instructions that, in response to being executed on at least one processor, cause the at least one processor to adjust the first threshold or the second threshold, or both the first threshold and the second threshold, based on one or more historical temperatures of the rechargeable energy storage device, or based on one or more predicted future temperatures of the rechargeable energy storage device, or based on both historical and predicted future temperatures of the rechargeable energy storage device.

Example 101 includes the subject matter of any of examples 93-100. The one or more tangible, non-transitory machine readable media include a plurality of instructions that, in response to being executed on at least one processor, cause the at least one processor to adjust the first threshold or the second threshold, or both the first threshold and the second threshold, based on one or more historical impedances of the rechargeable energy storage device.

Example 102 includes the subject matter of any of examples 93-101. The one or more tangible, non-transitory machine readable media include a plurality of instructions that, in response to being executed on at least one processor, cause the at least one processor to adjust the first threshold or the second threshold, or both the first threshold and the second threshold, based on one or more historical impedances of the rechargeable energy storage device, or based on one or more predicted future impedances of the rechargeable energy storage device, or based on both historical and predicted future impedances of the rechargeable energy storage device.

Example 103 includes the subject matter of any of examples 93-102. The one or more tangible, non-transitory machine readable media include a plurality of instructions that, in response to being executed on at least one processor, cause the at least one processor to increase the charge termination voltage based on the comparison of the first threshold level with the voltage of the rechargeable energy storage device during peak load, and to decrease the charge termination voltage based on the comparison of the second threshold level with the end voltage of the rechargeable energy storage device after peak load.

Example 104 includes the subject matter of any of examples 93-103. The second threshold level is higher than the first threshold level.

Example 105 includes the subject matter of any of examples 93-104. The one or more tangible, non-transitory machine readable media include a plurality of instructions that, in response to being executed on at least one processor, cause the at least one processor to adjust a charge current of the rechargeable energy storage device or a discharge current of the rechargeable energy storage device, or both the charge current of the rechargeable energy storage device and the discharge current of the rechargeable energy storage device, to manage temperature of the rechargeable energy storage device.

Example 106 In some examples, machine-readable storage includes machine-readable instructions, when executed, to implement a method or realize an apparatus as in any other example.

Example 107 In some examples, one or more machine readable medium include(s) code, when executed, to cause a machine to perform the method of any other example.

Example 108 In some examples, an apparatus includes means to perform a method as in any other example.

Example 109 In some examples, an apparatus includes a control unit. The apparatus includes means to perform a method as in any other example.

Although example embodiments and examples of the disclosed subject matter are described with reference to circuit diagrams, flow diagrams, block diagrams etc. in the drawings, persons of ordinary skill in the art will readily appreciate that many other ways of implementing the disclosed subject matter may alternatively be used. For example, the arrangements of the elements in the diagrams, or the order of execution of the blocks in the diagrams may be changed, or some of the circuit elements in circuit diagrams, and blocks in block/flow diagrams described may be changed, eliminated, or combined. Any elements as illustrated or described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, one or more volatile or non-volatile memory devices, such as storage devices or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile or non-volatile memory readable by the processor, at least one input device or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, or in a distributed environment, and with program code stored locally or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. An apparatus to adjust charge termination voltage, comprising:
   a controller to:
      increase a charge termination voltage of a charger of a rechargeable energy storage device based on an identification that the voltage of the rechargeable energy storage device during peak load is at or below a first threshold level, wherein the charge termination voltage is a voltage at which the charger stops charging the rechargeable energy storage device and wherein the charge termination voltage is a voltage at which the rechargeable energy storage device has capacity to support peak load of a system; and
      decrease the charge termination voltage based on an identification that an end voltage of the rechargeable energy storage device after peak load is at or above a second threshold level that is higher than the first threshold level;
   wherein peak load is a maximum load on the system.

2. The apparatus of claim 1, the controller to adjust the charge termination voltage based on a temperature of the rechargeable energy storage device.

3. The apparatus of claim 1, the controller to adjust the charge termination voltage based on an impedance of the rechargeable energy storage device.

4. The apparatus of claim 3, wherein the impedance includes an ohmic portion and a polarization portion.

5. The apparatus of claim 1, the controller to adjust the first threshold level or the second threshold level, or both the first threshold level and the second threshold level, based on one or more temperatures of the rechargeable energy storage device.

6. The apparatus of claim 1, the controller to adjust the first threshold level or the second threshold level, or both the first threshold level and the second threshold level, based on one or more impedances of the rechargeable energy storage device.

7. The apparatus of claim 1, the controller to adjust the first threshold level or the second threshold level, or both the first threshold level and the second threshold level, based on one or more historical temperatures of the rechargeable energy storage device.

8. The apparatus of claim 1, the controller to adjust the first threshold level or the second threshold level, or both the first threshold level and the second threshold level, based on one or more historical temperatures of the rechargeable energy storage device, or based on one or more predicted future temperatures of the rechargeable energy storage device, or based on both historical and predicted future temperatures of the rechargeable energy storage device.

9. The apparatus of claim 1, the controller to adjust the first threshold level or the second threshold level, or both the first threshold level and the second threshold level, based on one or more historical impedances of the rechargeable energy storage device.

10. The apparatus of claim 1, the controller to adjust the first threshold level or the second threshold level, or both the first threshold level and the second threshold level, based on one or more historical impedances of the rechargeable energy storage device, or based on one or more predicted future impedances of the rechargeable energy storage device, or based on both historical and predicted future impedances of the rechargeable energy storage device.

11. The apparatus of claim 1, the controller to adjust a charge current of the rechargeable energy storage device or a discharge current of the rechargeable energy storage device, or both the charge current of the rechargeable energy storage device and the discharge current of the rechargeable energy storage device, to manage temperature of the rechargeable energy storage device.

12. The apparatus of claim 1, comprising:
the charger, the charger to charge the rechargeable energy storage device to the charge termination voltage, wherein the charge termination voltage is a voltage at which the rechargeable energy storage device has capacity to support peak load of a system.

13. A method to adjust charge termination voltage, comprising:
increasing a charge termination voltage of a charger of a rechargeable energy storage device based on an identification that the voltage of the rechargeable energy storage device during peak load is at or below a first threshold level, wherein the charge termination voltage is a voltage at which the charger stops charging the rechargeable energy storage device and wherein the charge termination voltage is a voltage at which the rechargeable energy storage device has capacity to support peak load of a system; and
decreasing the charge termination voltage based on an identification that an end voltage of the rechargeable energy storage device after peak load is at or above a second threshold level that is higher than the first voltage level;
wherein peak load is a maximum load on the system.

14. The method of claim 13, comprising:
adjusting the charge termination voltage based on a temperature of the rechargeable energy storage device or based on an impedance of the rechargeable energy storage device.

15. The method of claim 13, comprising:
adjusting the first threshold level or the second threshold level, or both the first threshold level and the second threshold level, based on one or more temperatures of the rechargeable energy storage device or based on one or more impedances of the rechargeable energy storage device.

16. One or more tangible, non-transitory machine readable media comprising a plurality of instructions that, in response to being executed on at least one processor, cause the at least one processor to:
increase a charge termination voltage of a charger of a rechargeable energy storage device based on an identification that the voltage of the rechargeable energy storage device during peak load is at or below a first threshold level, wherein the charge termination voltage is a voltage at which the charger stops charging the rechargeable energy storage device and wherein the charge termination voltage is a voltage at which the rechargeable energy storage device has capacity to support peak load of a system; and
decrease the charge termination voltage based on an identification that an end voltage of the rechargeable energy storage device after peak load is at or above a second threshold level that is higher than the first threshold level;
wherein peak load is a maximum load on the system.

17. The one or more tangible, non-transitory machine readable media of claim 16, comprising a plurality of instructions that, in response to being executed on at least one processor, cause the at least one processor to:
adjust the charge termination voltage based on a temperature of the rechargeable energy storage device or based on an impedance of the rechargeable energy storage device.

18. The one or more tangible, non-transitory machine readable media of claim 16, comprising a plurality of instructions that, in response to being executed on at least one processor, cause the at least one processor to:
adjust the first threshold level or the second threshold level, or both the first threshold level and the second threshold level, based on one or more temperatures of the rechargeable energy storage device or based on one or more impedances of the rechargeable energy storage device.

19. The one or more tangible, non-transitory machine readable media of claim 16, comprising a plurality of instructions that, in response to being executed on at least one processor, cause the at least one processor to:
adjust the first threshold level or the second threshold level, or both the first threshold level and the second threshold level, based on one or more historical temperatures of the rechargeable energy storage device, based on one or more predicted future temperatures of the rechargeable energy storage device, or based on both historical and predicted future temperatures of the rechargeable energy storage device.

20. The one or more tangible, non-transitory machine readable media of claim 16, comprising a plurality of instructions that, in response to being executed on at least one processor, cause the at least one processor to:
adjust the first threshold level or the second threshold level, or both the first threshold level and the second threshold level, based on one or more historical impedances of the rechargeable energy storage device, based on one or more predicted future impedances of the rechargeable energy storage device, or based on both historical and predicted future impedances of the rechargeable energy storage device.

21. The one or more tangible, non-transitory machine readable media of claim 16, comprising a plurality of instructions that, in response to being executed on at least one processor, cause the at least one processor to:
adjust a charge current of the rechargeable energy storage device or a discharge current of the rechargeable energy storage device, or both the charge current of the rechargeable energy storage device and the discharge current of the rechargeable energy storage device, to manage temperature of the rechargeable energy storage device.

* * * * *